US012786334B2

(12) United States Patent
Yasuda et al.

(10) Patent No.: US 12,786,334 B2
(45) Date of Patent: Nov. 3, 2026

(54) READING DEVICE AND RECORDING DEVICE

(71) Applicant: CANON KABUSHIKI KAISHA, Tokyo (JP)

(72) Inventors: Yuya Yasuda, Tokyo (JP); Takuma Tachibana, Kanagawa (JP); Shigeru Kawasaki, Kanagawa (JP); Kazuki Matsuo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 18/752,577

(22) Filed: Jun. 24, 2024

(65) Prior Publication Data

US 2025/0008042 A1 Jan. 2, 2025

(30) Foreign Application Priority Data

Jun. 30, 2023 (JP) ................................ 2023-108148

(51) Int. Cl.

*H04N 1/047* (2006.01)
*B41J 3/44* (2006.01)
*H04N 1/024* (2006.01)
*H04N 1/10* (2006.01)

(52) U.S. Cl.

CPC ................ *H04N 1/047* (2013.01); *B41J 3/44* (2013.01); *H04N 1/0249* (2013.01); *H04N 1/1061* (2013.01); *H04N 2201/0081* (2013.01); *H04N 2201/04755* (2013.01)

(58) Field of Classification Search

None

See application file for complete search history.

(56) References Cited

U.S. PATENT DOCUMENTS

2014/0198359 A1 7/2014 Shiomi .................. H04N 1/047
2018/0220034 A1* 8/2018 Katayama .......... H04N 1/00798
2023/0370555 A1 11/2023 Ono et al. ................ H04N 1/00
2024/0064248 A1 2/2024 Ono et al. ................ H04N 1/00
2024/0323288 A1 9/2024 Kawasaki ................ H04N 1/00
2024/0333854 A1 10/2024 Matsuo .................... H04N 1/00

FOREIGN PATENT DOCUMENTS

JP 2017-077932 4/2017
JP 2021-180418 11/2021

OTHER PUBLICATIONS

U.S. Appl. No. 18/786,284, filed Jul. 26, 2024.

* cited by examiner

*Primary Examiner* — Helen Zong
(74) *Attorney, Agent, or Firm* — Venable LLP

(57) ABSTRACT

A reading device includes a platen having a first face, reading means for reading the document via the platen accommodated in a frame portion, a holder that holds image sensor such that the frame portion is in contact with a second face of the platen, and a guide member that extends in a scanning direction of the image sensor, and to which the holder is movably attached. The holder has, on an upstream side in the scanning direction with respect to the image sensor, a contact portion that contacts the frame portion. The contact portion contacts the frame portion so as to be capable of displacing a position of contact with the frame portion in a direction intersecting the second face. The image sensor reads the document while moving under force that the frame portion receives from the contact portion.

11 Claims, 24 Drawing Sheets

B-B CROSS-SECTIONAL VIEW

A-A CROSS-SECTIONAL VIEW

ENLARGED VIEW OF PORTION C

READING DEVICE AND RECORDING DEVICE

BACKGROUND OF THE INVENTION

Field of the Invention

The present invention relates to a reading device.

Description of the Related Art

There are conventionally known reading devices for reading images recorded in documents, which are installed in image scanners, multifunction devices, photocopiers, facsimile devices, and so forth. Such reading devices are also referred to as flatbed scanners, and include a platen glass on which documents are placed, and a reading unit that is disposed directly beneath the platen glass and that is disposed so as to be capable of reciprocal movement in a plane that is parallel to a plane of the glass.

Known reading units include an image sensor having a longitudinal direction, such as a contact image sensor (CIS) or the like, which is installed on a holding member. Japanese Patent Application Publication No. 2017-077932 describes an example of a configuration of a reading device including an image sensor and a holding member.

SUMMARY OF THE INVENTION

In the configuration in Japanese Patent Application Publication No. 2017-077932, a shaft member for pivoting is provided extending from a side face of a casing of the image sensor, in a direction approximately parallel with the longitudinal direction of the image sensor, and the holding member is provided in an arrangement of being fit to this shaft member. When reading a document by the image sensor, driving force is conveyed from a driving unit such as a motor or the like, to the reading unit, whereby the holding member is scanned along a guide portion provided in an orthogonal direction to the longitudinal direction of the image sensor.

Now, in order to read the document with high precision, it is important that the distance between the document and the image sensor be maintained constant during the scanning. However, the guide portion for scanning of the holding members tends to exhibit deformation, such as change over time (creep deformation), undulations due to forming, and so forth. Scanning the holding member over the guide portion that has become deformed in this way results in a relative position between the image sensor and the holding member changing while reading the document. That is to say, dynamic balance about the center of gravity of the image sensor tends to be lost due to frictional force acting on the shaft portion of the image sensor described above, and there is concern that the distance between the image sensor and the document will change while reading, and reading precision will deteriorate.

The present invention has been made in light of the above problems, and accordingly it is an object thereof to provide technology that improves reading precision in a reading device.

The present invention provides a reading device, comprising:

a platen having a first face configured to face a document;

an image sensor including reading means configured to read the document via the platen, and a frame portion configured to accommodate the reading means;

a holder that has biasing means configured to bias the frame portion toward a second face of the platen, and that holds the image sensor such that the frame portion contacts the second face; and a guide member that extends in a scanning direction of the image sensor, and to which the holder is movably attached, wherein the holder has, on an upstream side in the scanning direction with respect to the image sensor, a contact portion that contacts the frame portion, the contact portion coming into contact with the frame portion so as to be capable of displacing a position of contact with the frame portion in a direction intersecting the second face of the platen, and the image sensor reads the document by the reading means, by moving in the scanning direction under force that the frame portion receives from the contact portion.

According to the present invention, technology can be provided that improves reading precision in a reading device.

Further features of the present invention will become apparent from the following description of exemplary embodiments with reference to the attached drawings.

BRIEF DESCRIPTION OF THE DRAWINGS

FIGS. 3A to 3D are views of a scanner unit according to the embodiment, in which FIG. 3A is a top view and FIGS. 3B to 3D are cross-sectional views;

FIGS. 16A and 16B are views illustrating the configuration of the reading unit according to the present embodiment, in which FIG. 16A is a top view and FIG. 16B is a cross-sectional view;

FIGS. 19A and 19B are views illustrating a configuration of a reading unit according to a conventional example, in which FIG. 19A is a top view and FIG. 19B is a cross-sectional view;

DESCRIPTION OF THE EMBODIMENTS

A preferred embodiment for carrying out the invention will be exemplarily described below in detail with reference to the Figures. Note that the dimensions, materials, shapes, relative placements thereof, and so forth, of components described in the embodiment are not intended to limit the scope of the intention to these alone, unless specifically stated otherwise. Also, materials, shapes, and so forth, of members described once below are the same as the initial description in subsequent descriptions as well, unless specifically stated again. Technology known to the related field, or widely-known technology, can be applied to configurations and processes that are not illustrated or described in particular. Also, repetitive description may be omitted.

A reading device according to the present invention can be applied to a flatbed scanner device, or a photocopier in which a flatbed scanner device and a printer device or the like are combined, a facsimile device, a multifunction device, and so forth. Description will be made below by way of an example of an image reading device that inputs document images to a computer or the like. Note that like signs denote like corresponding portions throughout the drawings. X, Y, and Z indicate directions that are orthogonal to each other. X is a width direction, Y is a depthwise direction, and Z is a heightwise direction, of the image reading device.

First Embodiment

Figure 1:
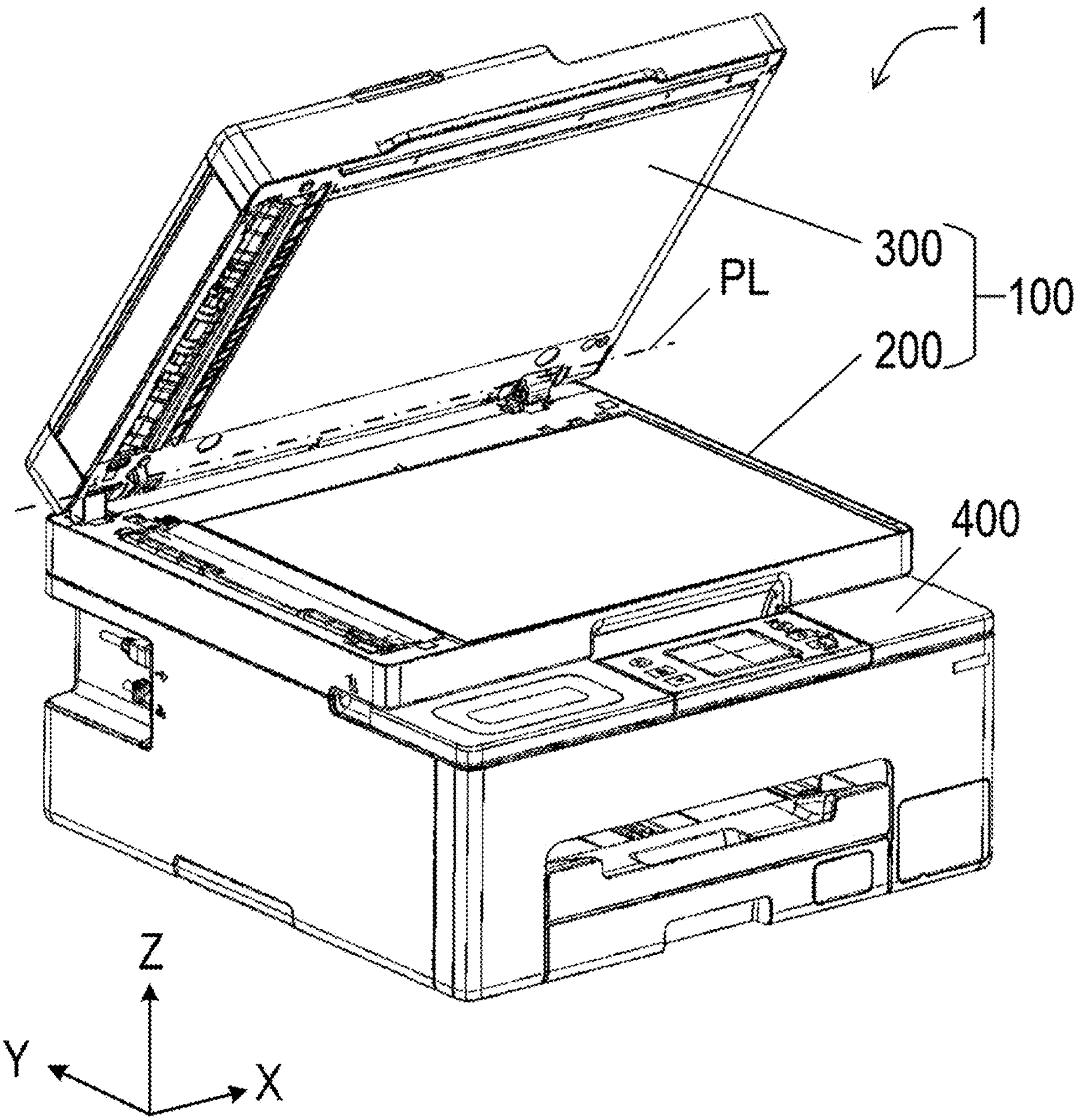
FIG. 1 is a perspective view of a multifunction device that has a reading device according to an embodiment.

FIG. 1 is an external perspective view of a multifunctional device 1 according to the present invention. The multifunctional device 1 is a device in which an image reading device main unit 100 is combined with a printer device 400 that is an ink-jet printer. The printer device 400 is capable of printing (recording) images read by the image reading device main unit 100, by recording means. The image reading device main unit 100 according to the present embodiment is generally made up of a scanner unit 200 that is an image reading unit, and an ADF unit 300. FIG. 1 illustrates a state in which the ADF unit 300 is open in order to place a document on the scanner unit 200. An axial line PL of an axis of pivoting for when opening and closing the ADF unit 300 is indicated by a dot-dashed line. The term "ADF" here is short for "auto document feeder", and refers to a mechanism that sequentially and automatically transports a plurality of documents to a reader unit. Note that the printer device 400 is not limited to an ink-jet printer, and may be a laser printer (electrophotographic image formation device), for example.

Figure 2:
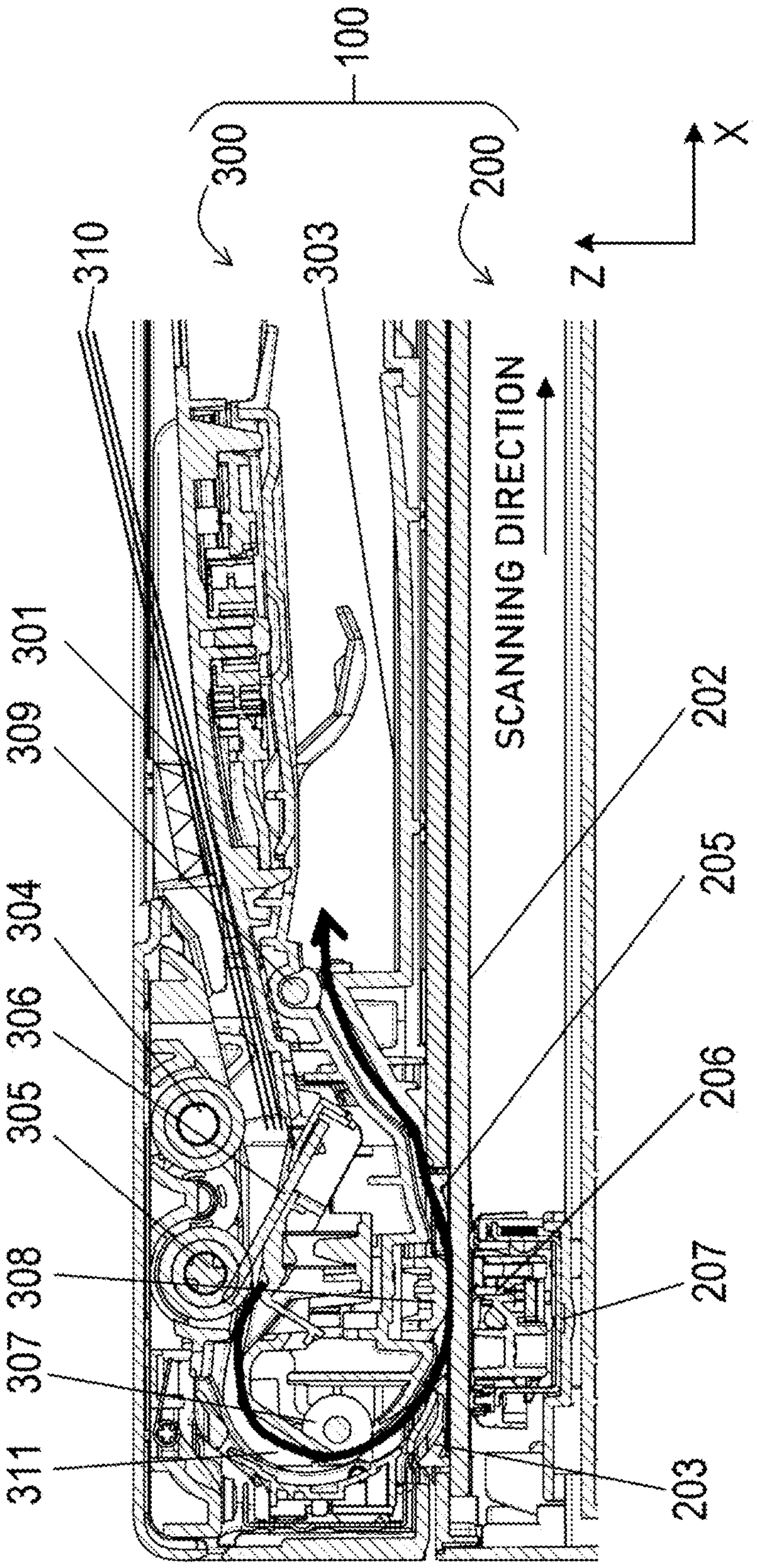
FIG. 2 is a partial cross-sectional view of an image reading device according to the embodiment.

A configuration of the ADF unit 300 of the image reading device main unit 100 will be described with reference to FIG. 2. FIG. 2 is a partial cross-sectional view taken along plane X-Z of the image reading device main unit 100 (scanner unit 200 and ADF unit 300) in a state in which the ADF unit 300 is closed. The heavy line arrow in FIG. 2 indicates a document transport path 311, a greater part of the document transport path 311 passes through the ADF unit 300, and a part thereof faces the scanner unit 200.

The ADF unit 300 includes a document loading tray 301 on which documents are loaded, a document transport mechanism unit, and a document discharge unit 303. A configuration of the document transport mechanism unit will be described below in order from an upstream side of document transportation. The document transport mechanism unit as referred to here indicates an entire sheet transport mechanism from a pickup roller 304 to a discharge roller 309, which will be described below.

First, a document 310 is placed on the document loading tray 301, whereupon the document 310 is transported to a separating roller 305 side by the pickup roller 304 of the document transport mechanism unit, and is thereafter transported one sheet at a time to a transport roller 307 that is on a downstream side, by the separating roller 305 and a separating pad 306. Next, the document 310 is transported to a downstream-side transportation guide 203 that is detachable, by the transport roller 307. Note that when passing the transportation guide 203 that is detachable, the document 310 is pressed by a white pressing plate 308, and thereby comes into close contact with the transportation guide 203 that is detachable. At this time, the document 310 is read by an image sensor 206 that will be described later. The white pressing plate 308 has a size that covers the entire main scanning direction region of the image sensor 206 illustrated in FIG. 6.

Next, the document 310 that has passed the transportation guide 203 that is detachable passes a document size indicator member 205 that is on the downstream side of the transportation guide 203 that is detachable, and is discharged to the document discharge unit 303 by the discharge roller 309 on the downstream side. The above-described transportation guide 203 that is detachable and the document size indicator member 205 are component members of the scanner unit 200. Now, various types of document detection sensors, which are omitted from illustration, are disposed in the document transport mechanism unit, detecting passage of a leading edge and a trailing edge of documents, and outputs thereof are used for timing control for reading by the image sensor 206.

There are two types of reading of the document 310 in the image reading device main unit 100 according to the present invention, which are fixed document reading (flatbed reading) and transported document reading (ADF reading). For fixed document reading, the document 310 is fixed on a platen glass 202, and the document 310 is read by moving a reading unit 207 in a sub-scanning direction (X direction). Also, for transported document reading, the reading unit 207 is fixed at a predetermined position beneath the transportation guide 203 that is detachable (ADF position), and the document 310 is read by the ADF unit 300 while being transported. The reading unit 207 within the scanner unit

200 illustrated in FIG. 2 is illustrated in a state of standing by at the ADF position to read the document 310 that is automatically transported by the ADF unit 300 described above.

A configuration of the scanner unit 200 of the image reading device main unit 100 will be described below with reference to FIGS. 3A to 3C to FIG. 8.

Figure 3A:
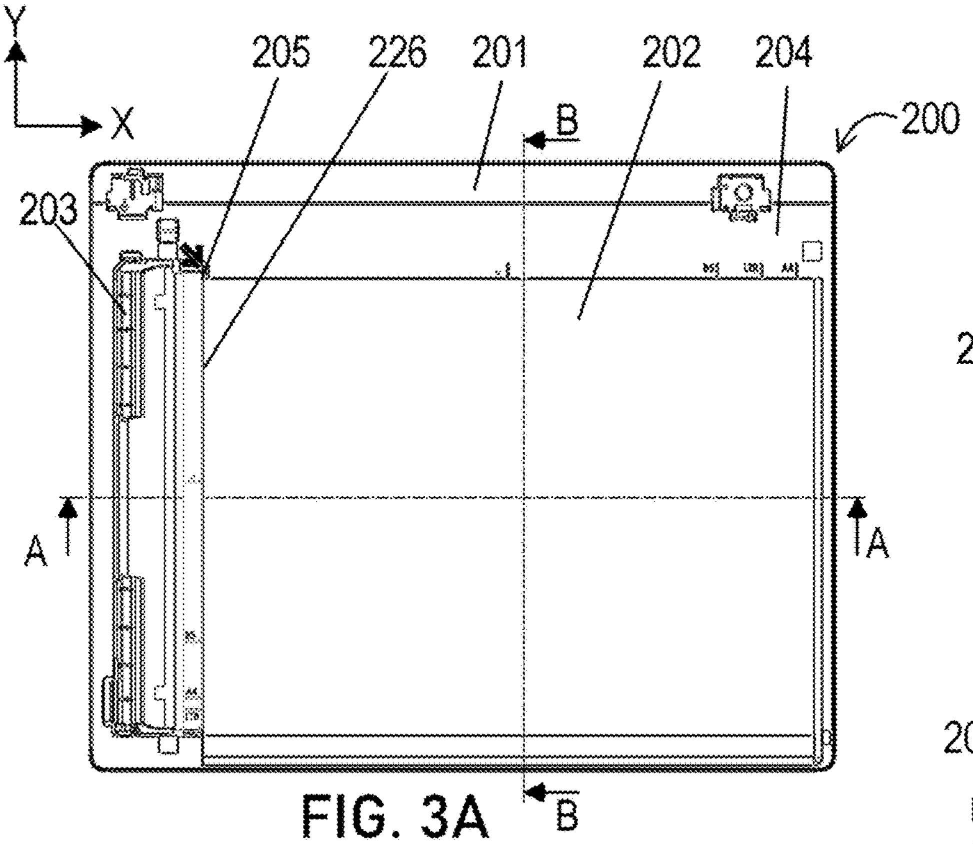

FIG. 3A is a top view of the scanner unit 200 with the ADF unit 300 removed from the image reading device main unit 100, and illustrates the entirety of a glass frame unit 201. This glass frame unit 201 includes the platen glass 202 on which documents are placed, and a glass frame 204 for holding the aforementioned transportation guide 203 that is detachable, for reading documents that are automatically transported. Also, the glass frame 204 includes the aforementioned document size indicator member 205 and a document abutting reference 226, between the platen glass 202 and the transportation guide 203 that is detachable. Of both faces of the platen glass 202 serving as the platen, a face that a face of the document to be read faces, and is on an upper side in normal installation, is an upper face, and is also referred to as a "first face". Also, a face on an opposite side from the upper face is a lower face, and is also referred to as a "second face".

Figure 3C:
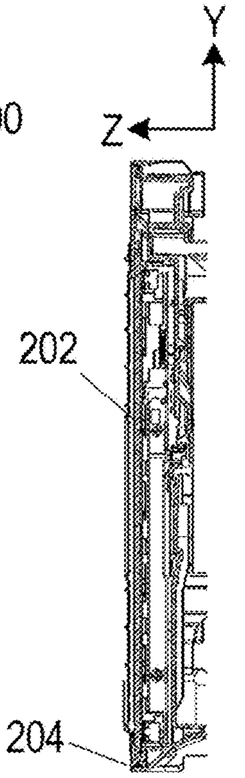
Figure 3B:
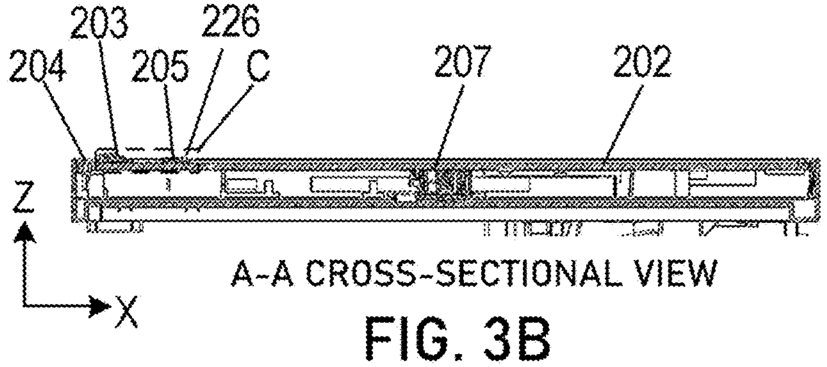
Figure 3D:
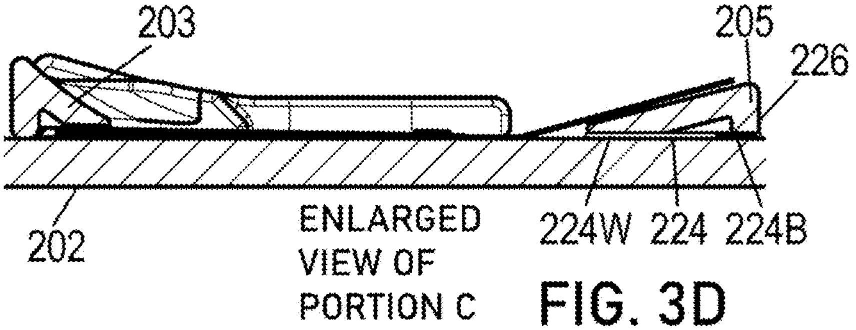

FIG. 3B is a cross-sectional view taken along A-A in FIG. 3A. FIG. 3C is a cross-sectional view taken along B-B in FIG. 3A, and illustrates a main scanning direction (Y direction) cross section of the reading unit 207. FIG. 3D is an enlarged view of a portion C around the document size indicator member 205 in the glass frame unit 201 in FIG. 3B.

In FIG. 3D, a white sheet 224 is disposed on a document placing face side of the platen glass 202. In this cross-sectional view, a white region 224W and a black region 224B are illustrated in a simplified manner, but in reality, the configuration is according to that described with reference to FIG. 4 later.

Figure 4:
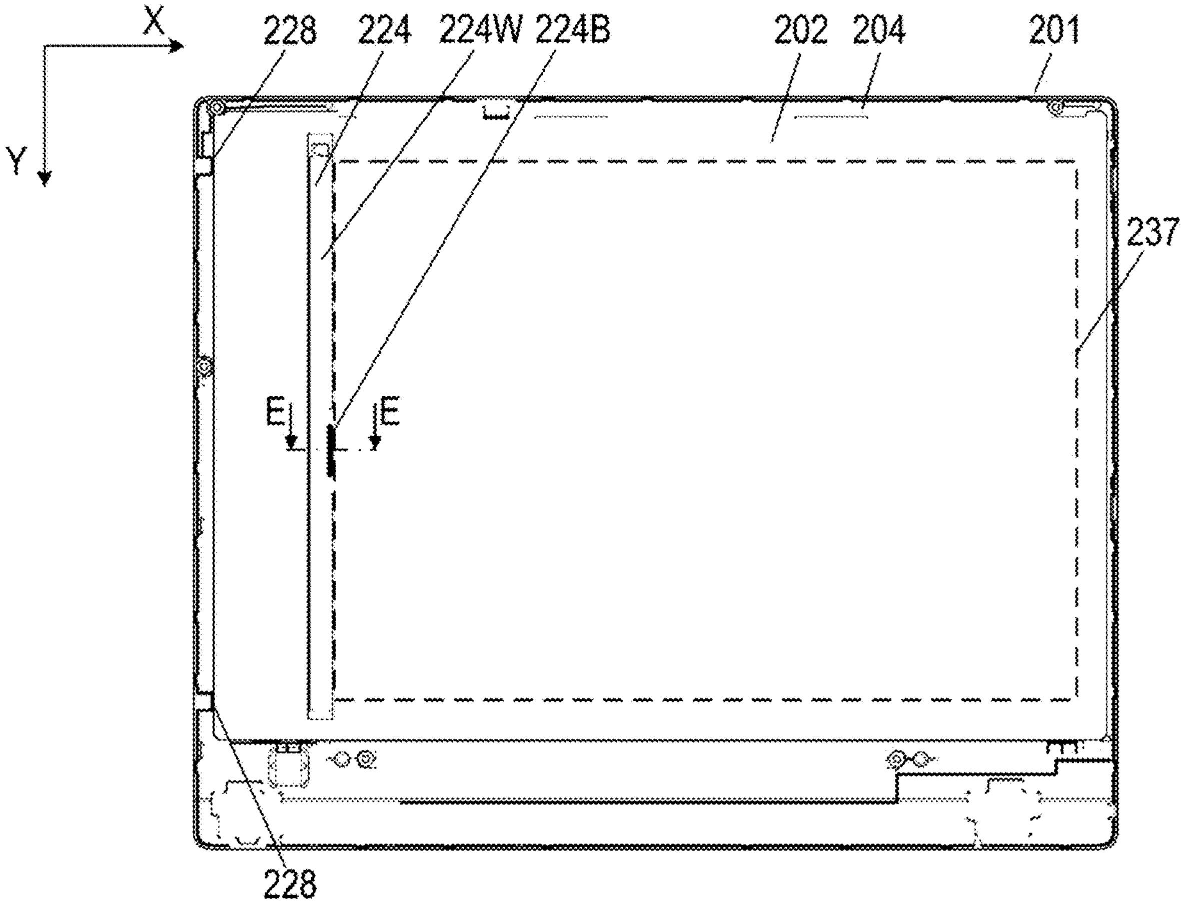
FIG. 4 is a rear view of a glass frame unit according to the embodiment.

FIG. 4 is a rear view of the glass frame unit 201 in FIG. 3A, and part of the white sheet 224 is illustrated. The platen glass 202 is abutted against two glass frame abutting portions 228 of the glass frame 204, and thus is positioned in the X direction. In the viewing direction of FIG. 4, the white sheet 224 is disposed on a rear side (the side of the same face as the document placing face) of the platen glass 202.

In FIG. 4, the X-directional position of the white sheet 224 is disposed between the glass frame abutting portions 228 and a stationary document reading area 237. The white sheet 224 also integrally includes therein the white region 224W for performing shading correction of the image sensor, and the black region 224B that serves as a sub-scanning direction reference for the image sensor. The white sheet 224 for performing shading processing has a size that covers the entire main scanning direction region of the image sensor. The position in the sub-scanning direction (X direction) of the black region 224B within the white sheet 224 is formed at a side closer to the stationary document reading area 237 than the white region 224W. The black region 224B and a main scanning direction area will be described later with reference to FIG. 6.

Figure 5A:
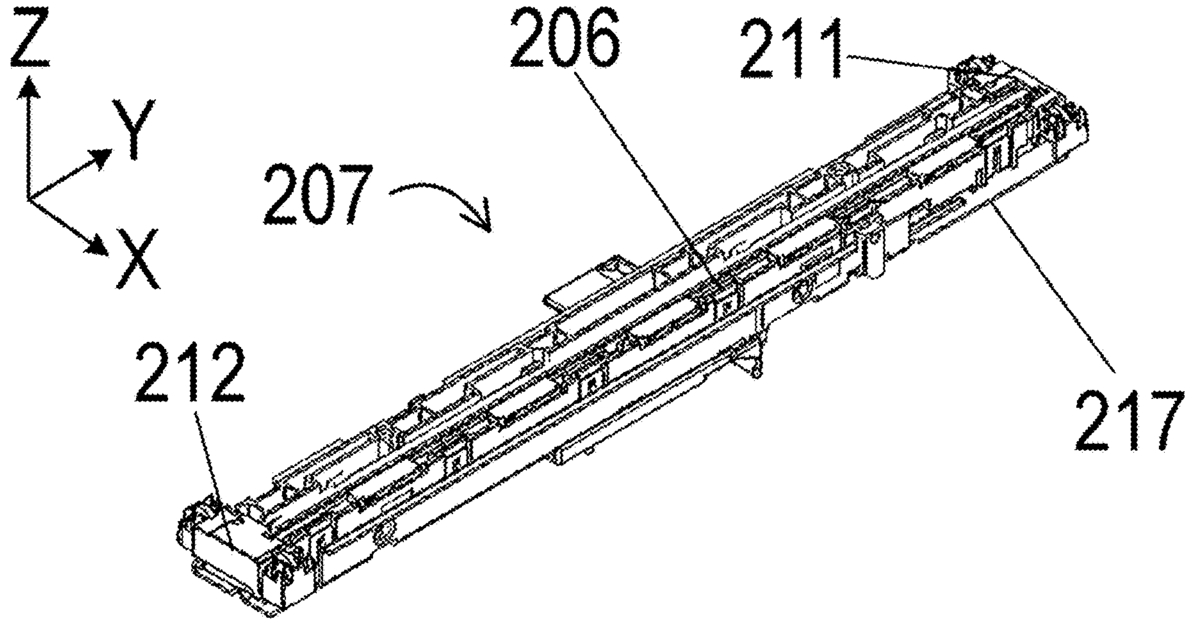
FIG. 5A is a perspective view of a reading unit according to the embodiment.
Figure 5B:
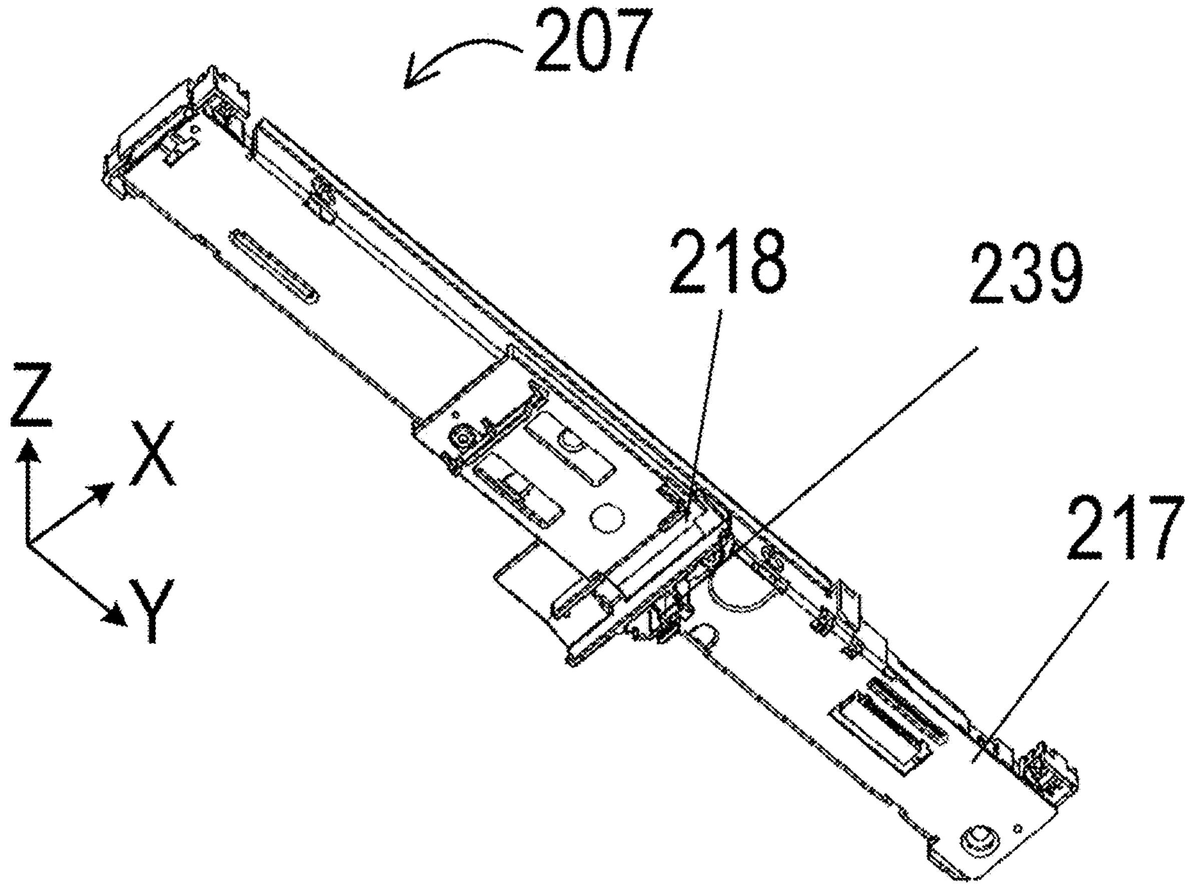
FIG. 5B is a perspective view of the reading unit according to the embodiment.
Figure 5C:
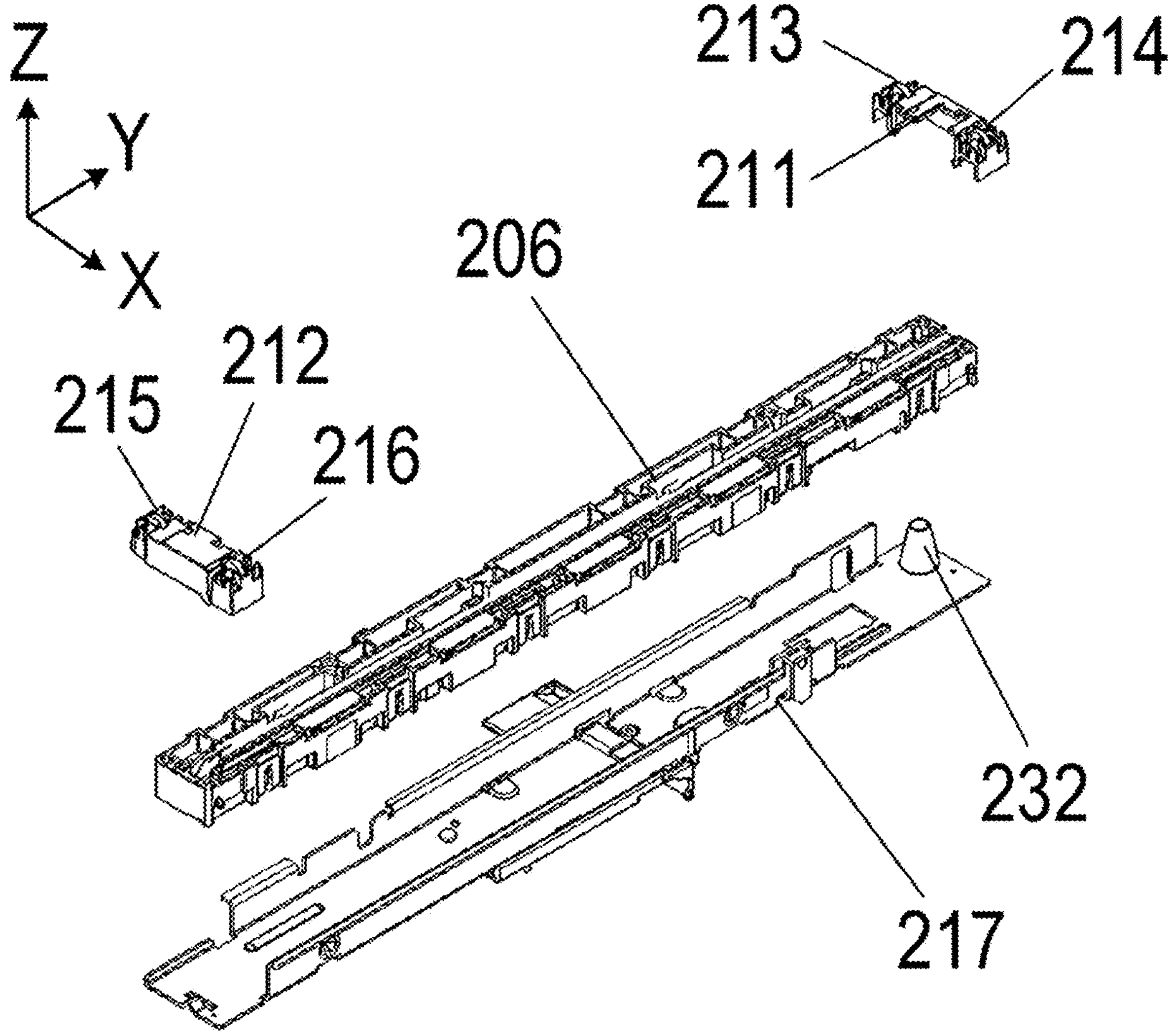
FIG. 5C is a disassembled view of the reading unit according to the embodiment.

FIGS. 5A and 5B are perspective views of the reading unit 207. FIG. 5C is a disassembled view of the reading unit 207. The reading unit 207 is made up of the image sensor 206, a sensor holder 217, a slider 218, and a drive conveying unit 239 that conveys driving force to the reading unit 207. The image sensor 206 has a longitudinal direction and a transverse direction, and the longitudinal direction is also referred to as "main scanning direction". The reading unit 207 is scanned in the sub-scanning direction (scan direction), which is a direction intersecting (typically, orthogonal to) the main scanning direction.

Roller units 211 and 212, for guaranteeing a focal point distance as to the document to be read, are disposed at both end portions of the image sensor 206 in the main scanning direction. Rollers 213 and 214, and rollers 215 and 216 are rotatably disposed at both end portions in the sub-scanning direction of the roller units 211 and 212. Also, a pressing spring 232 serving as biasing means, is disposed between the image sensor 206 and the sensor holder 217 that serves as a holder, pressing the image sensor 206 against the rear face of the platen glass at all times. Accordingly, these roller pairs are a configuration by which the reading unit 207 rolls over the rear face of the platen glass 202 that is omitted from illustration, when moving in the sub-scanning direction (X direction).

Figure 6:
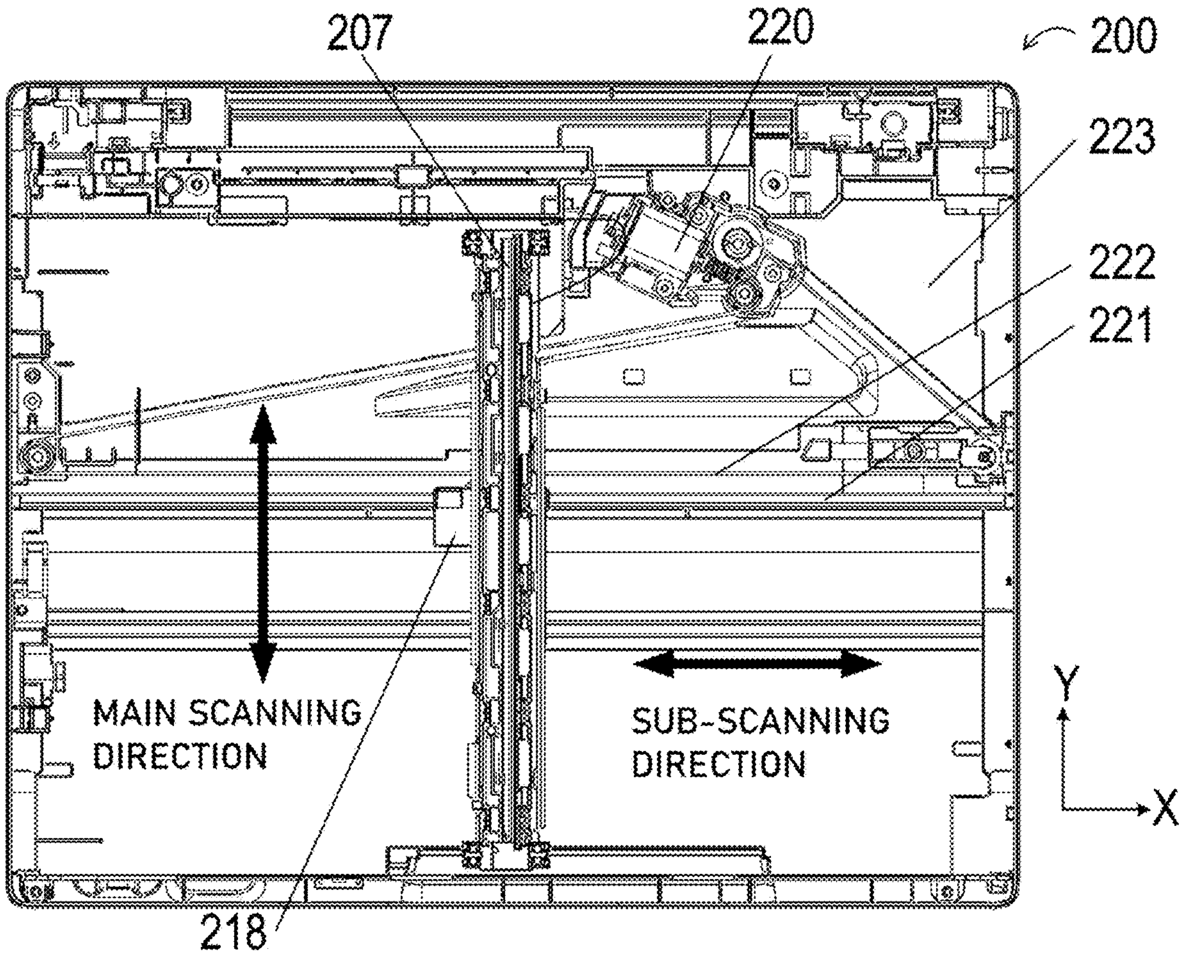
FIG. 6 is a top view illustrating an internal configuration of the image reading device according to the embodiment.

FIG. 6 illustrates a state in which the glass frame unit 201 is removed from the top view in FIG. 3A, to illustrate the overall inner configuration of the scanner unit 200. The layout and configurations of the reading unit 207 and a base frame 223 will be described with reference to FIG. 6.

A guide rail 221 serving as a guide member, of which the longitudinal direction is the sub-scanning direction, is disposed at approximately the middle portion in the Y direction of the base frame 223. The slider 218 of the reading unit 207, described above, is attached to the guide rail 221 so as to be capable of sliding in the sub-scanning direction (X direction). When scanning of the reading unit 207, first, a motor 220 serves as driving means and performs driving, thereby moving a belt 222. The reading unit 207 is then driven via the drive conveying unit 239 to which the belt 222 is connected, and reciprocally scans along the guide rail 221. Note that the present embodiment is a belt-driving type, in which a driving unit is disposed on the base frame 223 and conveys driving force thereof by the belt 222, but is also applicable to a self-driving type reading unit in which the driving means is disposed in the reading unit 207.

Figure 7:
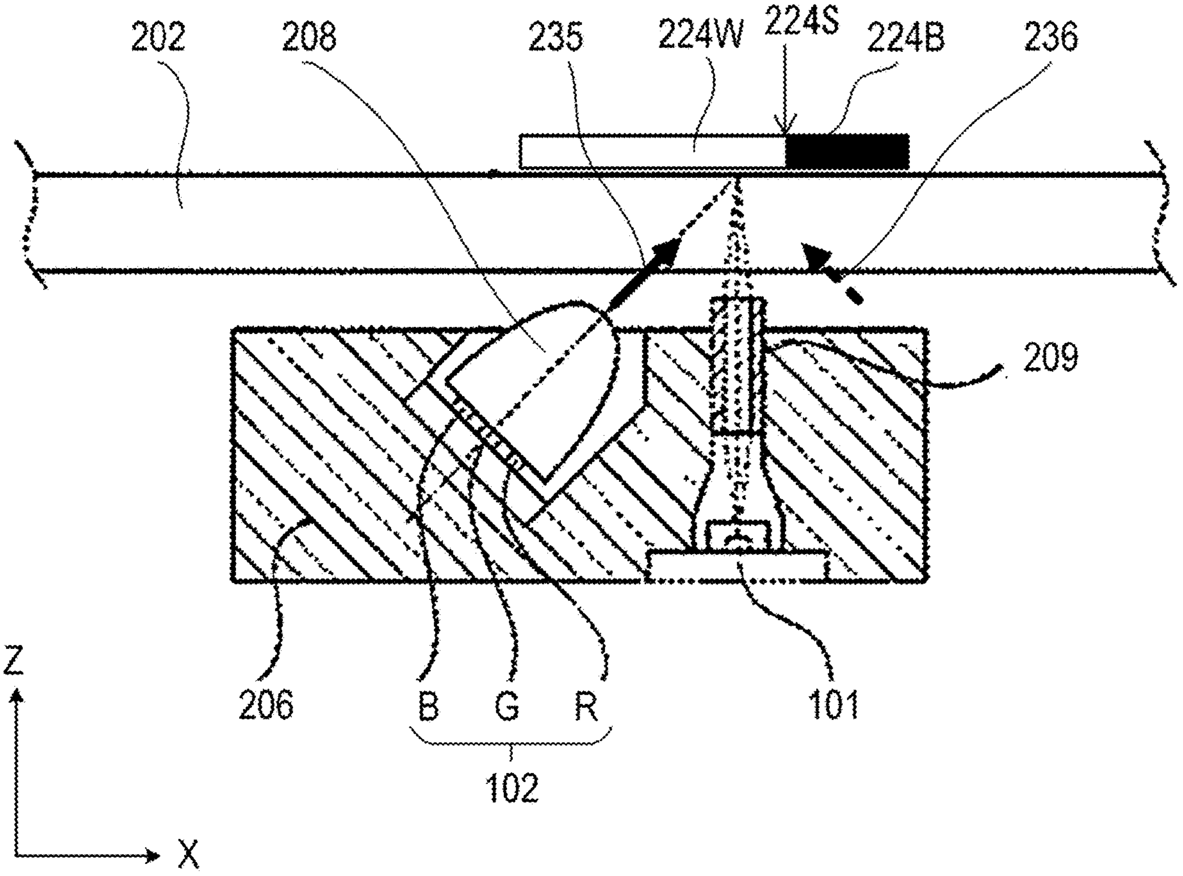
FIG. 7 is a cross-sectional view of an image sensor according to the embodiment.

An electrical configuration of the image sensor 206 will be described below with reference to FIGS. 7 and 8. FIG. 7 is a cross-sectional view of the image sensor 206. Inside of the image sensor 206 are assembled light-emitting diodes (LEDs) 102 that are light-emitting elements of the three colors of red, green, and blue (RGB), a rod lens array 209 in which rod lenses are arrayed, and a photo acceptance unit 101. Light that is radiated from the LEDs 102 to the document passes through the platen glass 202 and is reflected at the document face. This reflected light is imaged on the photo acceptance unit 101 by passing through the rod lens array 209. The image sensor 206 sequentially stiches lighting of the LEDs 102 of the three colors, and the image sensor 206 reads the reflected light from the document for each color, thereby performing color separation reading.

Figure 8:
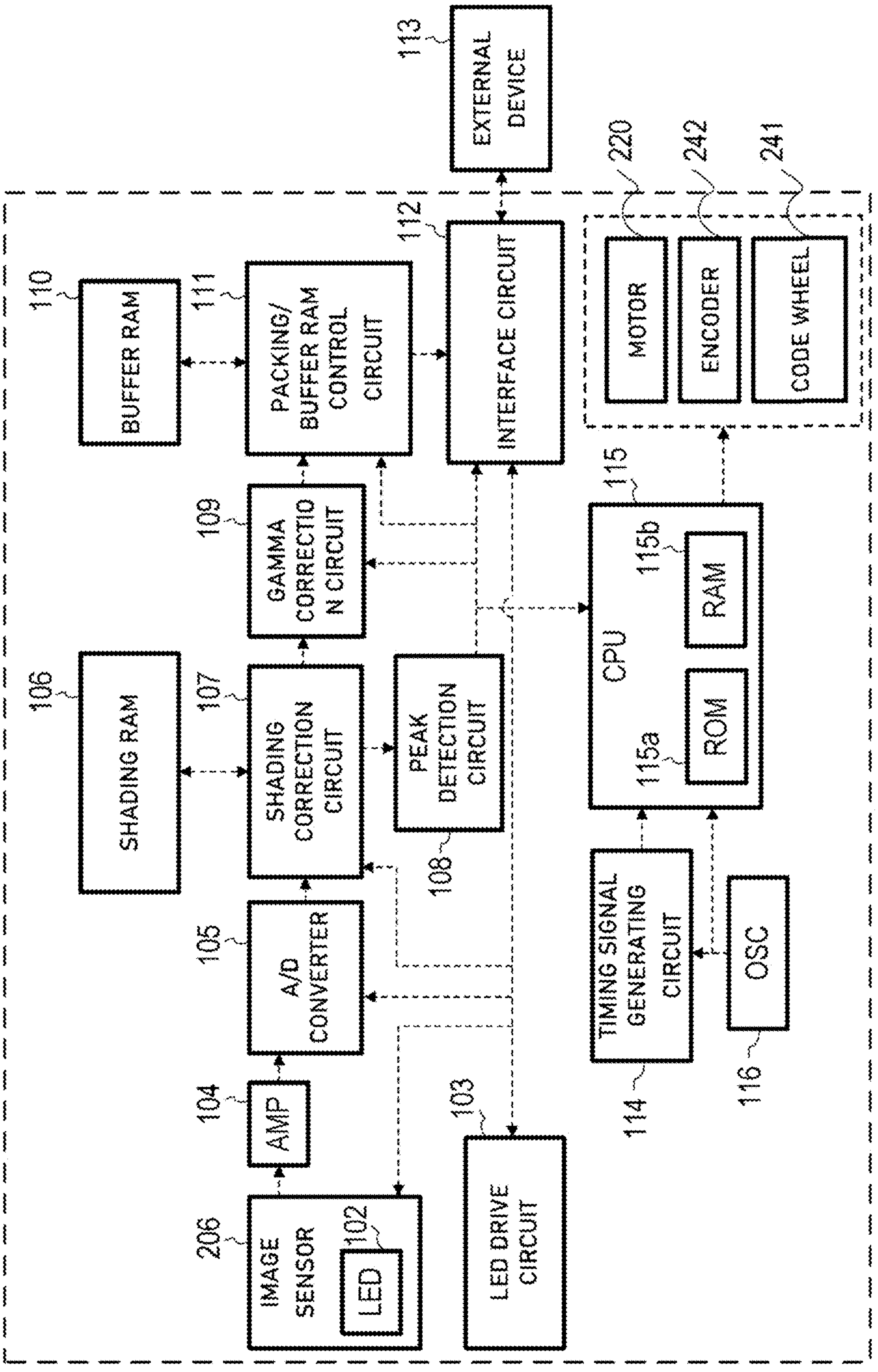
FIG. 8 is a block diagram illustrating an electrical circuit configuration according to the embodiment.

FIG. 8 is a block diagram illustrating a configuration of a control circuit of the reading unit according to the present embodiment. Circuit actions according to the present disclosure will be described below. In FIG. 8, the image sensor 206 is a sensor in which the LEDs 102 of three colors are integrated, serving as a light source. This image sensor 206 is moved in the scan direction beneath the platen glass. At the same time, the LEDs 102 of each color are switched and lit for each line by an LED drive circuit 103, whereby an RGB line-sequential color image can be read. An amplifier (AMP) 104 amplifies signals output from the image sensor 206. An analog-to-digital converter 105 performs analog-to-digital conversion of the amplified output of the amplifier 104, thereby yielding 8-bit digital output, for example.

Shading random access memory (RAM) 106 reads the white region 224W for shading processing described above (see FIG. 7), and stores data for shading correction that is obtained by computation processing of data thereof. A shading correction circuit 107 performs shading correction of the image data read by the image sensor 206, on the basis of data in the shading RAM 106. A peak detection circuit 108 is a circuit for detecting a peak value in the read image data, for each line, and is used for detecting a reference position of the reading unit 207 (see FIG. 6). A gamma correction circuit 109 performs gamma correction of the image data that is read, following a gamma curve set in advance by a host computer, which will be described later.

Buffer RAM 110 is memory for primary storage of image data, for matching actual reading actions and timing for communication with the host computer. A packing/buffer RAM control circuit 111 performs packing processing in accordance with an image output mode set in advance by the host computer, and thereafter processing of writing the data thereof to the buffer RAM 110, and processing for transferring the image data from the buffer RAM 110 to an interface circuit 112 and outputting thereof. Note that image output modes include binary, 4-bit multivalue, 8-bit multivalue, 24-bit multivalue, and so forth.

The interface circuit (driving means) 112 receives control signals and outputs image signals with an external device 113. The external device 113 is a device such as a personal computer or the like, serving as a host device (computer) of the image reading device.

A central processing unit (CPU) 115 is a microcomputer type CPU, for example, that has read-only memory (ROM) 115*a* storing processing procedures and work RAM 115*b*, and controls each part following procedures of a program that is stored in the ROM 115*a*. The CPU 115 controls rotation direction, rotation speed, and rotation amount of the motor 220 (see FIG. 6), by an encoder 242 reading slit information of a code wheel 241 that is turnably fixed coaxially with the motor. That is to say, the CPU 115 controls direction of movement, speed of movement, distance, and so forth of the reading unit 207 (see FIG. 6). An oscillator (OSC) 116 is an oscillator such as, for example, a crystal oscillator or the like. A timing signal generating circuit 114 generates various types of timing signals to serve as references for actions, by performing frequency dividing of the output of the OSC 116, in accordance with settings of the CPU 115.

Now, in the present embodiment, the boundary between the aforementioned black region 224B (see FIG. 7) and white region 224W (see FIG. 7) is a reference mark 224S for being read by the image sensor 206. The reference mark 224S that is read by the image sensor 206 is detected by the encoder, and is stored as a reference position in the RAM 115*b* within the CPU 115.

The CPU 115 functions as detecting means for detecting this reference mark 224S, and control means for deciding the reference position of the image sensor 206 in accordance with the reference mark 224S that is detected, and causing image reading to be started. On the basis of the reference position decided in accordance with the reference mark 224S that is detected in the sub-scanning direction, the CPU 115 performs initialization movement of the image sensor 206 before image reading when the power is turned on, and movement of the image sensor 206 following image reading.

Figure 12:
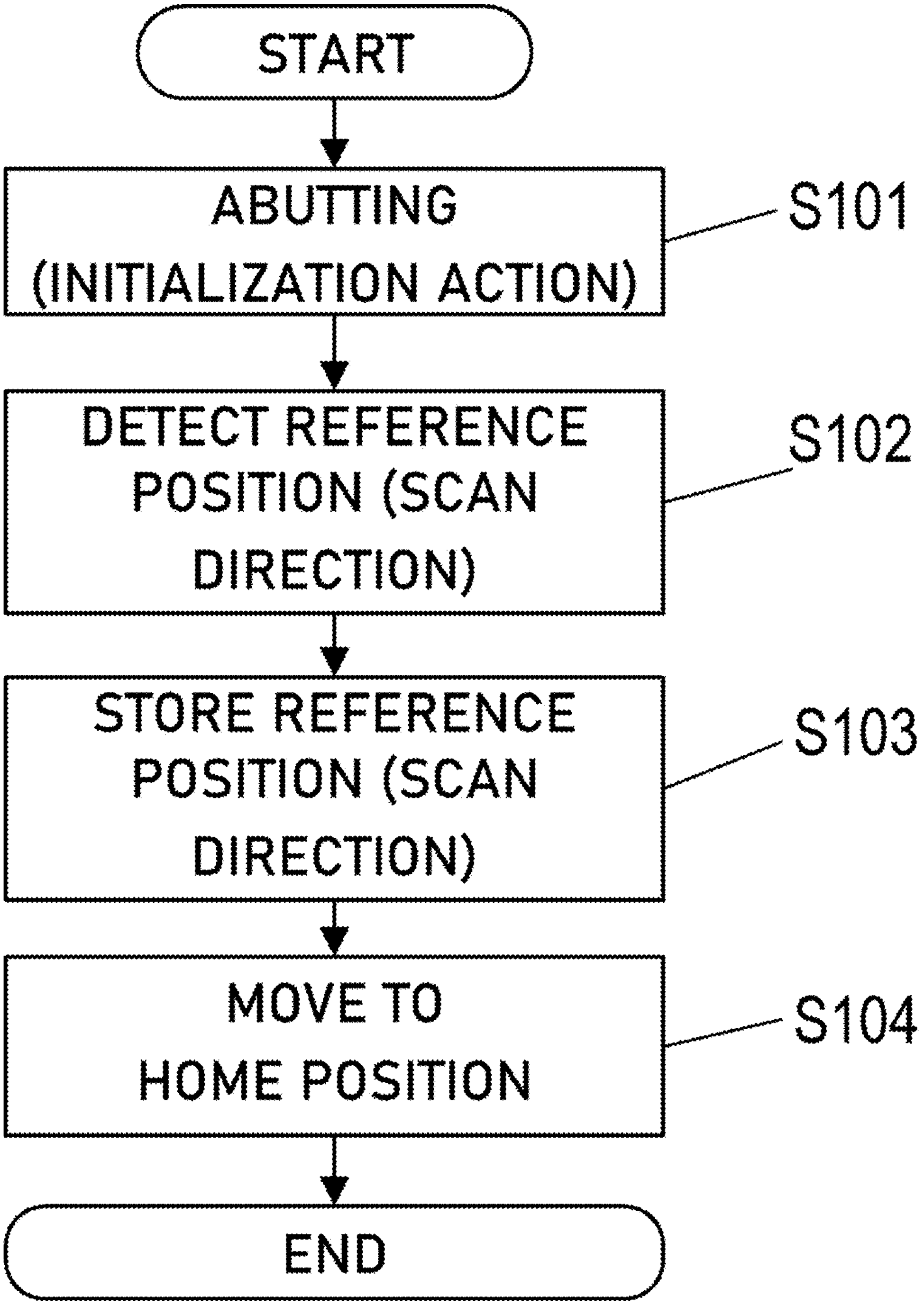
FIG. 12 is an action sequence diagram regarding when turning on the power, according to the embodiment.
Figure 13:
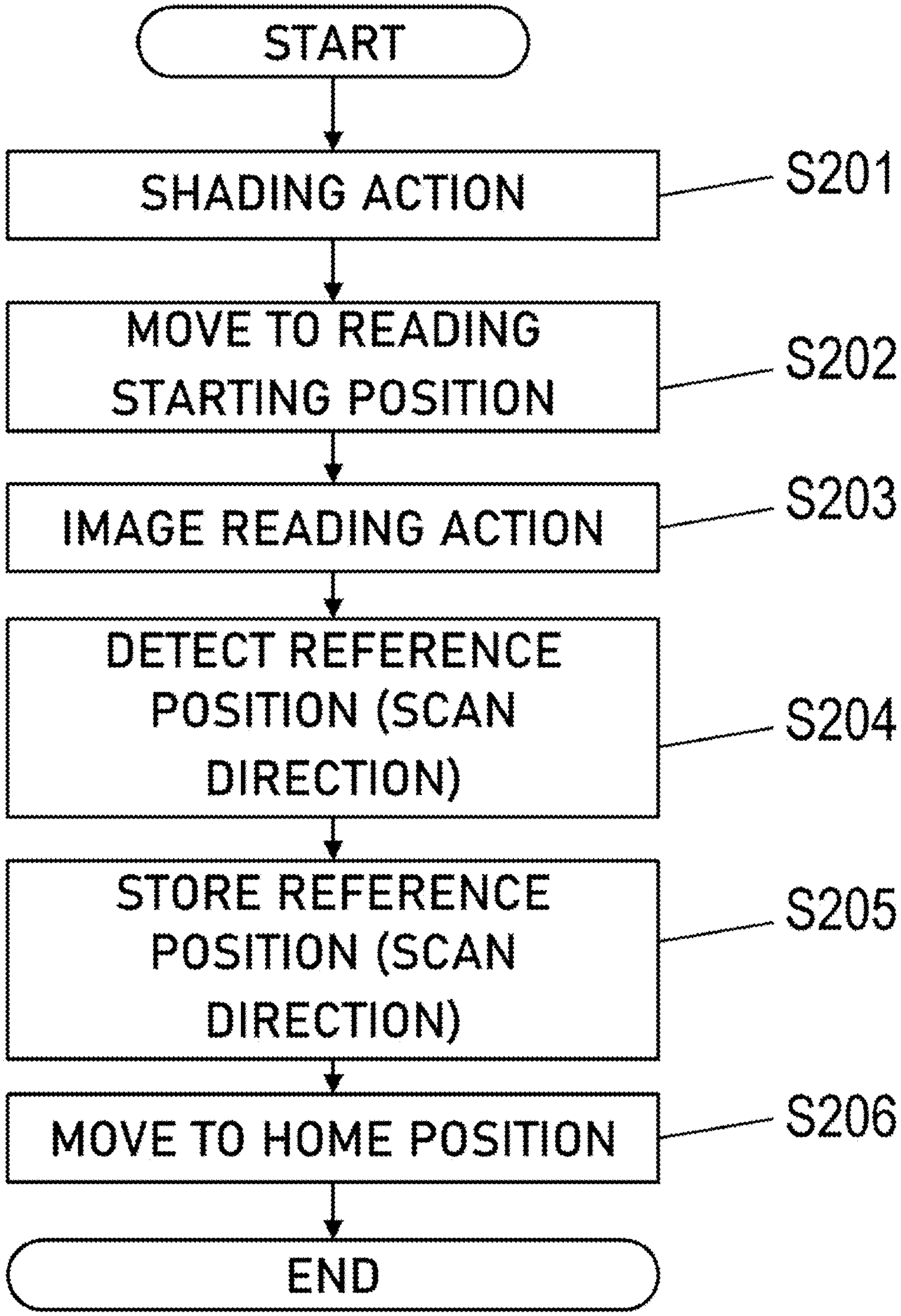
FIG. 13 is an action sequence diagram regarding when performing flatbed reading, according to the embodiment.
Figure 14:
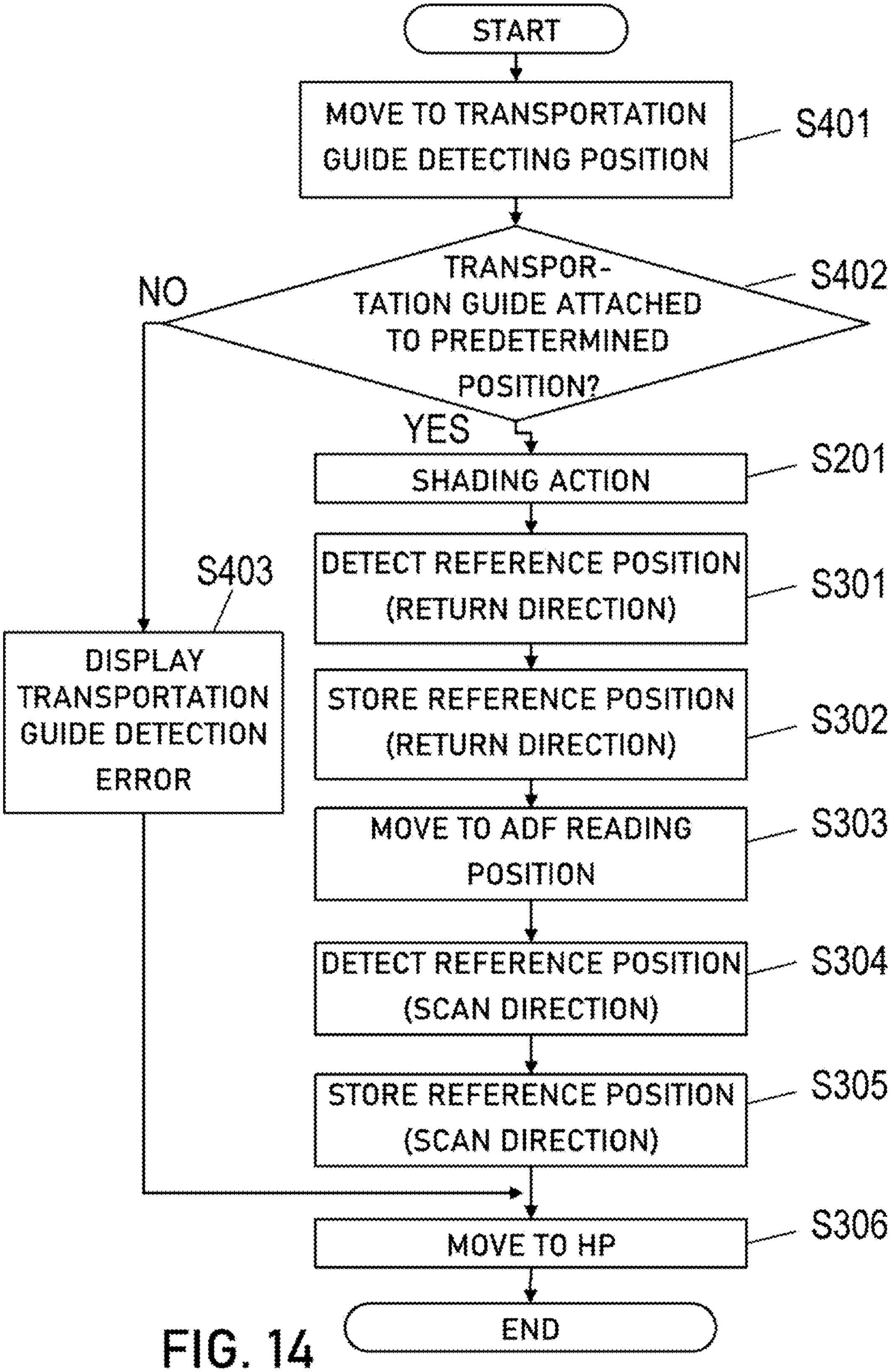
FIG. 14 is an action sequence diagram regarding when performing automatic document feeder (ADF) reading, according to the embodiment.

Next, actions of the reading unit 207 will be described with reference to FIGS. 9 to 14. FIG. 9 to FIGS. 11A to 11D are each partial cross-sectional views relating to actions. FIGS. 12 to 14 are each flowcharts showing action sequences.

Figure 9:
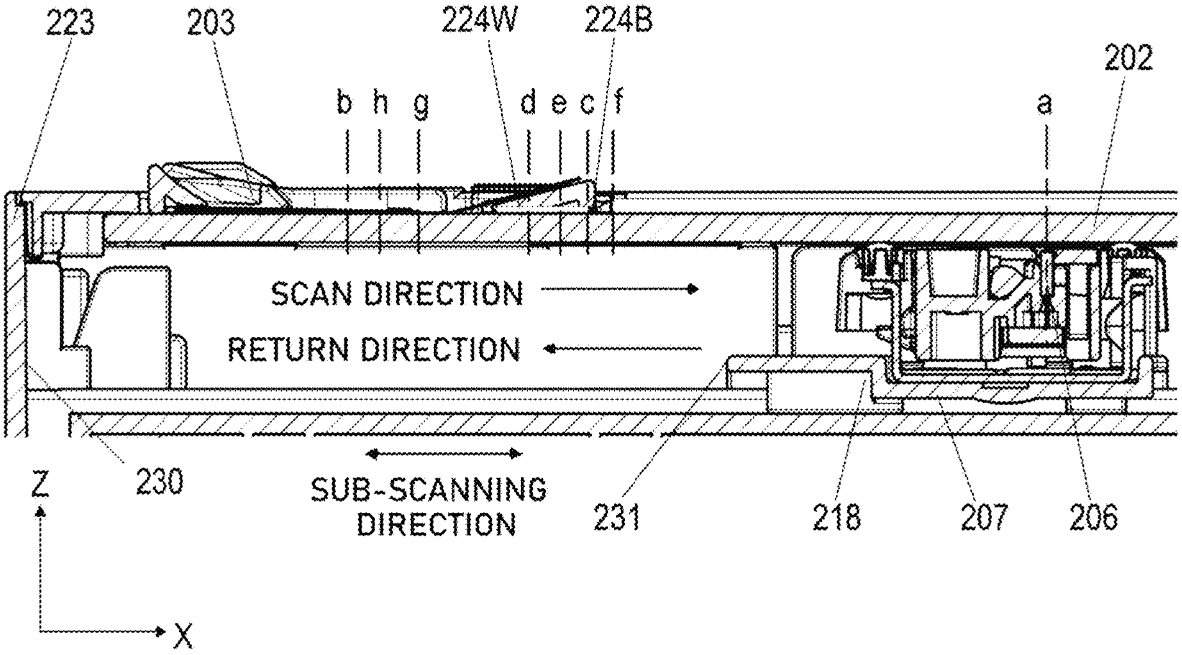
FIG. 9 is a cross-sectional view illustrating a principal layout of the reading unit according to the embodiment.

The positions a, b, c, d, e, f, g, and h in FIG. 9 indicate optical centers of the rod lens array 209 (see FIG. 7) of the image sensor 206 at various timings (indicated by dot-dashed line in FIG. 9). That is to say, these indicate a pre-power-on position a, an initialization position b, a reference position detection position c, a home position d (shading starting position), a shading ending position e, a document image reading starting position f, an ADF reading position g, and a transportation guide detecting position h. In FIG. 9, the reference position detection position c is illustrated as the white region 224W and the black region 224B in a simplified manner in the cross-sectional view, but in reality, the configuration is according to that described with reference to FIG. 4.

The reading unit 207 is at the position a illustrated in FIG. 9 before the power is turned on. However, the sub-scanning position of the reading unit 207 at this time may be any position, since the following initialization actions will be performed after the power is turned on.

Immediately after the power is turned on, the CPU 115 invariably moves the reading unit 207 toward a return direction, since there is no position information in device memory. The CPU 115 then moves the reading unit 207 until a slider abutting portion 231 of the slider 218 at below the platen glass 202 abuts against a base frame abutting portion 230 of the base frame 223 (initialization action) (step S101 in FIG. 12).

Figure 10A:
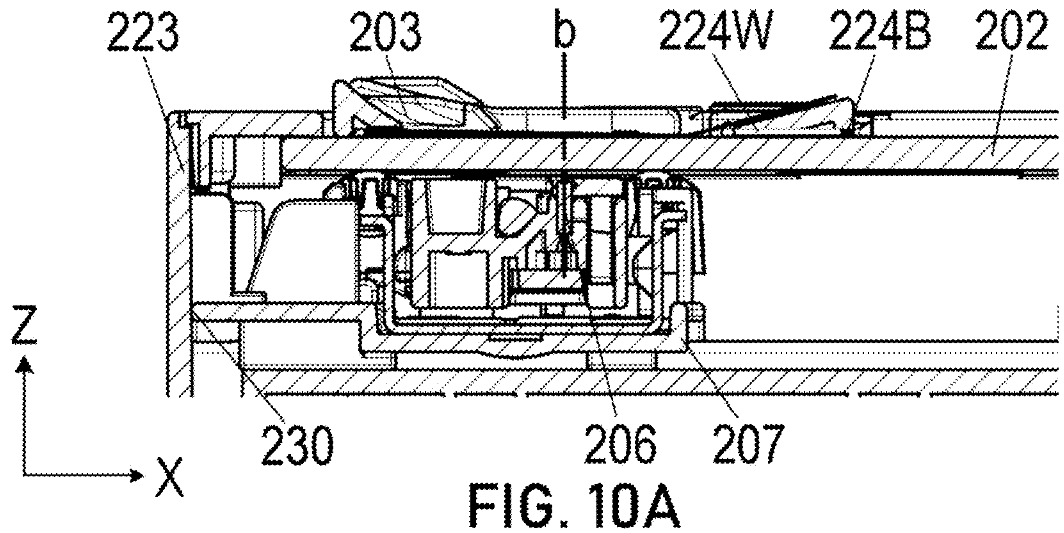
FIGS. 10A to 10C are cross-sectional view illustrating layouts of the reading unit according to the embodiment.

After abutting, the reading unit 207 can move no further, and accordingly, the load on the motor driving the reading unit 207 rises, and current supplied to the motor increases proportionately therewith. A threshold value is set for the current value using characteristics of this motor, and upon the current value reaching the threshold value, the CPU 115 determines that the reading unit 207 has abutted the frame abutting portion 230 of the base frame 223. The reading unit 207 is at the initialization position b at this time (FIG. 10A).

Figure 10B:
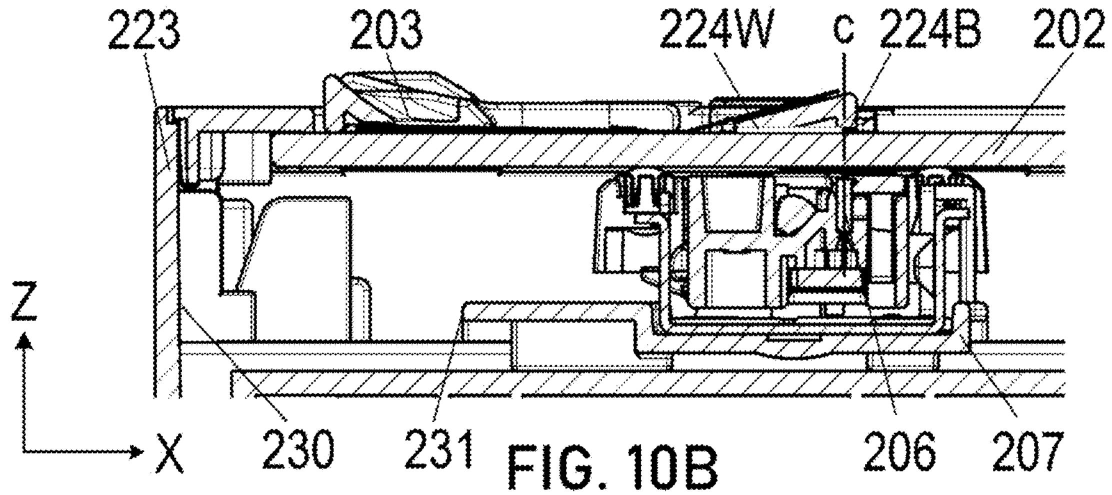

Next, the CPU 115 moves the reading unit 207 in the scan direction in order to detect the reference position c of the boundary portion between the white region 224W and the black region 224B in the white sheet 224. FIG. 10B illustrates the image sensor 206 having arrived at the position for reading the reference mark. Upon the image sensor 206 detecting the reference mark (the boundary position between the white region 224W and the black region 224B), the CPU 115 sets a reference mark detection position as the reference position c, on the basis of encoder signals (step S102 in FIG. 12).

The CPU 115 stores the reference position c detected at this time of moving toward the scan direction in the RAM 115*b* as a reference for flatbed reading (step S103 in FIG. 12).

Figure 10C:
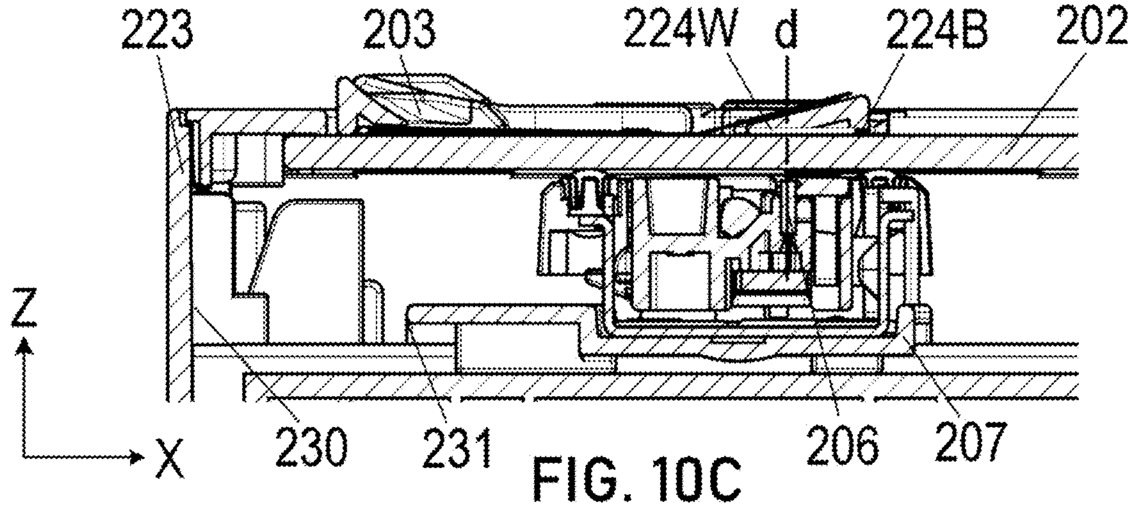
Figure 11A:
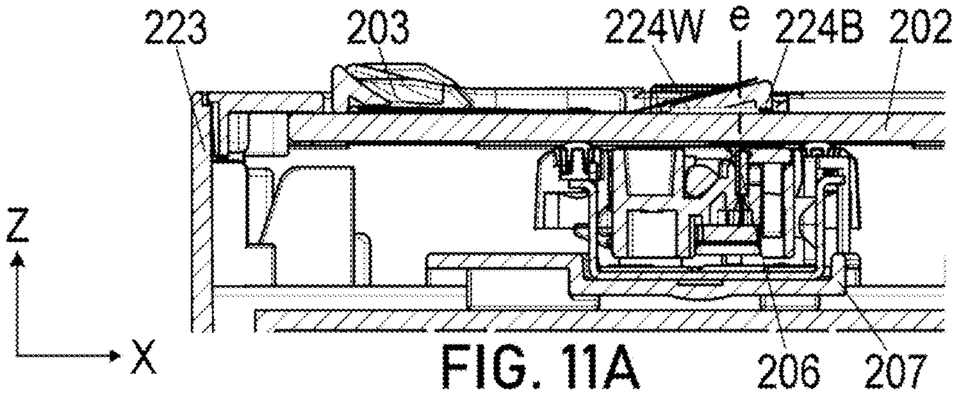
FIGS. 11A to 11D are cross-sectional view illustrating layouts of the reading unit according to the embodiment.
Figure 11B:
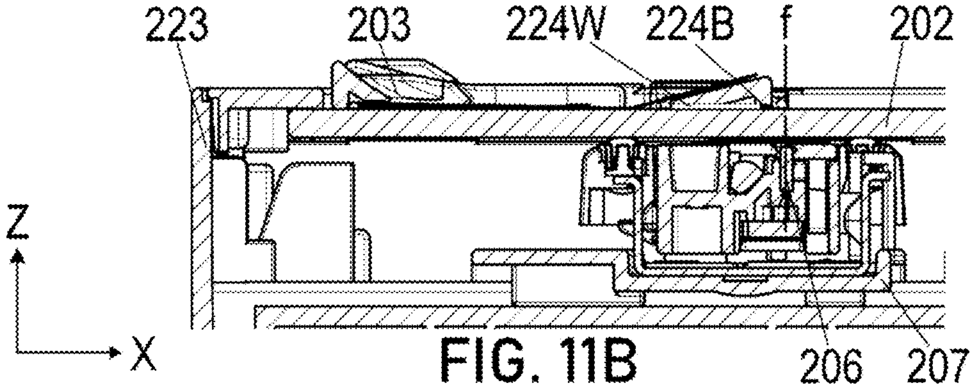
Figure 11C:
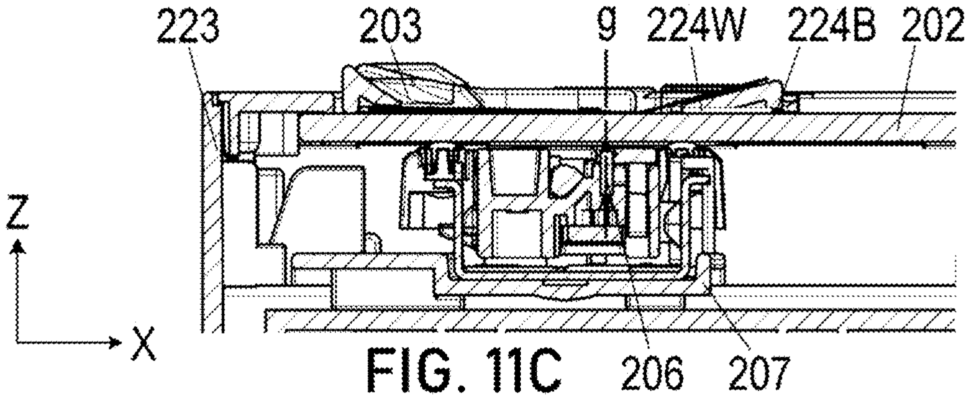
Figure 11D:
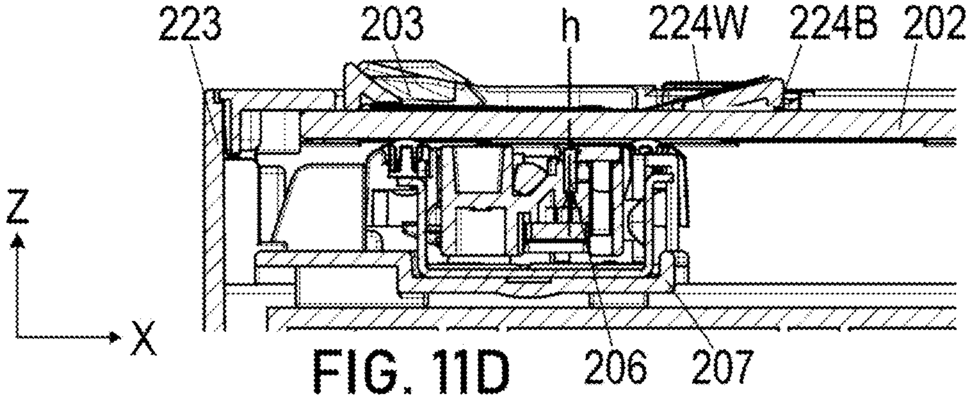

Next, the CPU 115 moves the reading unit 207 from the reference position c toward the return direction by a stipulated amount, so as to reach the home position d (step S104 in FIG. 12). In the present embodiment, this home position d is the shading start position (FIG. 10C).

This so far is actions of the CPU 115 performing initialization processing of the image sensor 206 after the power being turned on, detecting the reference position c, and moving to the home position d.

Next, actions of the reading unit 207 when performing flatbed reading will be described. Before reading an image, the CPU 115 instructs the reading unit 207 to perform shading processing of the image sensor 206. The white region 224W is read from the home position d that is the shading starting position for a predetermined length (shading ending position e) in the scan direction at a predetermined reading resolution, and the shading processing ends (FIG. 11A) (step S201 in FIG. 13).

After ending the shading, the CPU 115 moves the reading unit 207 to the home position d that is based on the reference position c stored in the RAM 115*b*. The reading unit 207 is then moved in the scan direction by a stipulated distance, and after speed in the sub-scanning direction has reached a stable reading speed, image reading is started from the document image reading starting position f (FIG. 11B) (steps S202 and S203 in FIG. 13).

According to the above configuration, reading position precision of the image sensor 206 is improved, and variance in the image sensor operation region becomes smaller. Following ending the reading action, the CPU 115 moves the reading unit 207 in the sub-scanning direction, toward the reference position c.

Following ending of the moving action, the CPU 115 performs reference position detection in the scan direction again (step S204 in FIG. 13). The reference position c is then stored in the RAM 115*b* (step S205 in FIG. 13). Then, the CPU 115 moves the reading unit 207 to the home position d (step S206 in FIG. 13). Thus, the flatbed reading action is completed.

Next, the actions of the reading unit 207 when performing ADF reading will be described. Processing that is the same as in the flowcharts described above will be denoted by the same step numbers. Upon ADF reading being started, the CPU 115 moves the reading unit 207 from the home position d to the transportation guide detecting position h (FIG. 11D) (step S401 in FIG. 14).

Following moving to the transportation guide detecting position h, the reading unit 207 stops, and performs reading of the entire region in the longitudinal direction of the image sensor 206 at this position, by the image sensor 206. This detection pattern that is read is used to for detection of whether the ADF is open or closed, and detection of the transportation guide 203 is performed.

In a case of the image sensor 206 failing to detect the transportation guide 203 (No in step S402 in FIG. 14), the CPU 115 displays information indicating that detection of the transportation guide was not performed normally (transportation guide detection error) (step S403 in FIG. 14). Step S403 is not limited to a simple error notification, and notification may be performed in which a user is made to confirm whether the transportation guide 203 is attached to the predetermined position. Also, the way of notification is not limited to displaying using the display screen, and may be notification using notification via the external device 113, audio, vibrations, or the like. Thereafter, the CPU 115 moves the reading unit 207 to the home position d, and the actions end (step S306 in FIG. 14).

Conversely, in a case where the image sensor 206 is successful in detecting the transportation guide 203 (Yes in step S402 in FIG. 14), the reading unit 207 performs shading processing of the image sensor 206 under instruction of the CPU 115 (step S201 in FIG. 14).

Thereafter, the CPU 115 moves the reading unit 207 in the scan direction from the home position d by a predetermined amount, and then in the return direction. Upon the image sensor 206 detecting the reference mark (the boundary position between the white region 224W and the black region 224B), the CPU 115 then sets the reference mark detection position as a reference position c', on the basis of encoder signals (FIG. 10B) (step S301 in FIG. 14). The CPU 115 stores the reference position c' when moving in the return direction as the reference for ADF reading in the RAM 115*b* (step S302 in FIG. 14). The CPU 115 then moves the reading unit 207 from the reference position c' in the return direction by a stipulated amount, so as to stop at the ADF reading position g (FIG. 11C) (step S303 in FIG. 14).

According to the above configuration, due to using the return direction detection reference position c' when moving in the return direction, the position precision when moving in the return direction is improved, and variance in the operation region of the image sensor 206 becomes smaller, thereby enabling precision when performing ADF reading to improve.

Upon ADF reading ending, the CPU 115 moves the reading unit 207 in the scan direction, and detects the reference position c again (FIG. 10B) (step S304 in FIG. 14). The CPU 115 then stores the reference position c in the RAM 115*b* (step S305 in FIG. 14). Then, the CPU 115 moves the reading unit 207 to the home position d (step S306 in FIG. 14).

Using the reference position c for flatbed reading and using the reference position c' for ADF reading, as in the present configuration, enables accurate movement to the desired position without being subjected to effects of drive train backlash. This consequently enables precise reading to be performed for both flatbed reading and ADF reading.

Next, actions when flatbed reading and ADF reading are performed a plurality of times will be described. When flatbed reading is to be performed after flatbed reading, following performing the actions of the flowchart of FIG. 13, the actions of the flowchart of FIG. 13 are performed again. When ADF reading is to be performed after flatbed reading, following performing the actions of the flowchart of FIG. 13, the actions of the flowchart of FIG. 14 are performed.

When flatbed reading is to be performed after ADF reading, following performing the actions of the flowchart of FIG. 14, the actions of the flowchart of FIG. 13 are performed. When ADF reading is to be performed after ADF reading, following performing the actions of the flowchart of FIG. 14, the actions of the flowchart of FIG. 14 are performed again. Note that the reference position c and the reference position c' stored in the RAM 115*b* are overwritten and saved each time the type of reading is switched.

Figure 15:
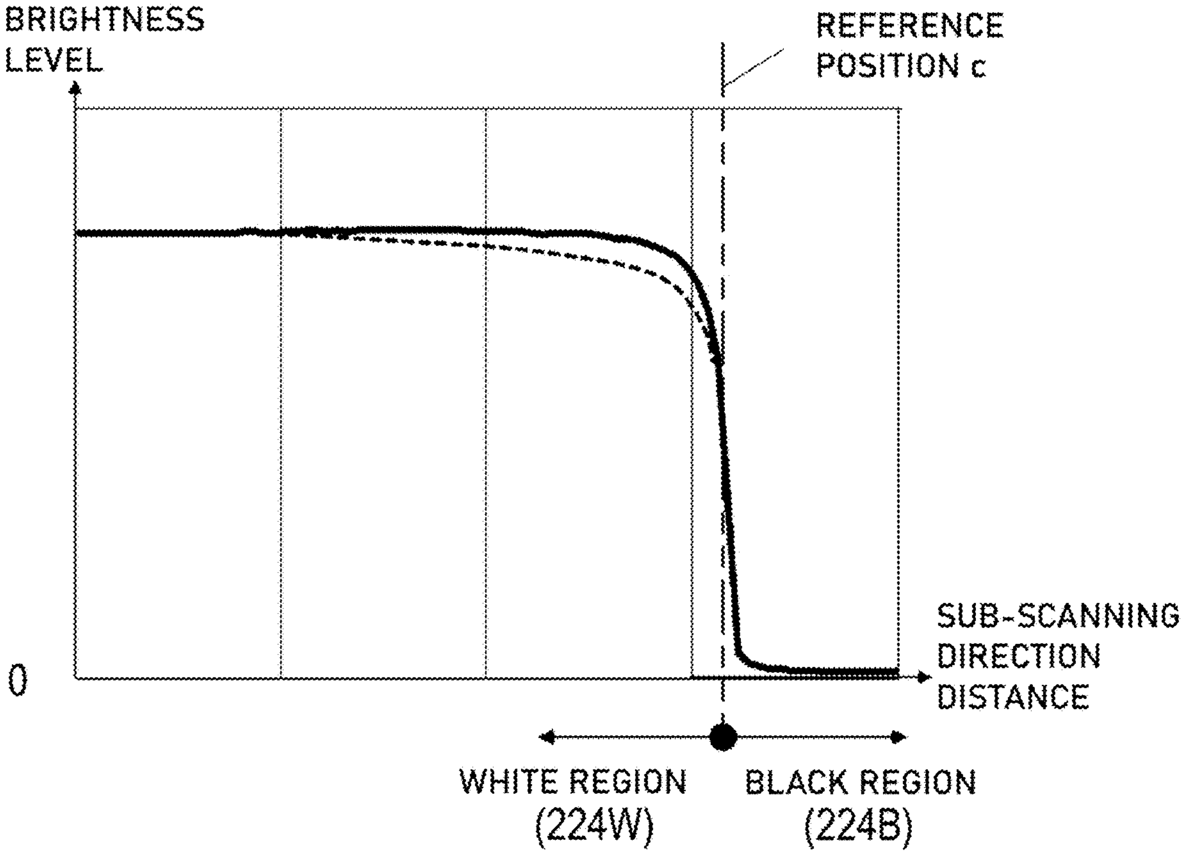
FIG. 15 is a distribution diagram of brightness levels of an image in which a white sheet is read, according to the embodiment.

A relation between the white region 224W and the black region 224B within the white sheet 224, and the illumination direction within the image sensor 206, will be described below. FIG. 15 is a graph in which brightness levels of an image, obtained by the image sensor 206 (see FIG. 7) reading the white sheet 224, are plotted. This FIG. 15 shows the distribution in the brightness level in the sub-scanning direction, corresponding to the E-E cross-section in FIG. 4. The vertical axis represents brightness level, and the horizontal axis represents distance in the sub-scanning direction.

The solid line graph represents the brightness levels when radiated from a solid-line arrow 235 direction in FIG. 7, and the dashed line graph represents the brightness levels when radiated from a dashed-line arrow 236 direction in FIG. 7. In FIG. 7, a lightguide member 208 that radiates light from the solid-line arrow 235 direction is disposed in the white region 224W side in FIG. 7 in the sub-scanning direction, with respect to the rod lens array 209. Also, the radiating direction of light is radiating from the white region 224W side in FIG. 7 toward the black region 224B side.

Figure 16A:
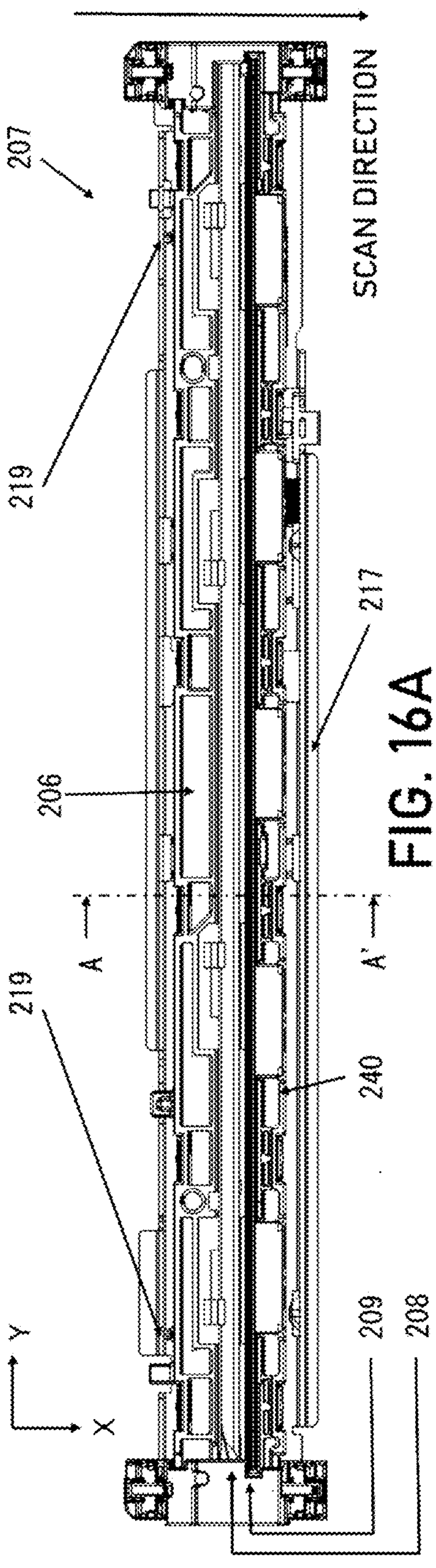

Next, the configuration and features of the reading unit 207 serving as reading means in the present embodiment will be described. FIG. 16A is a top view of the reading unit

Figure 16B:
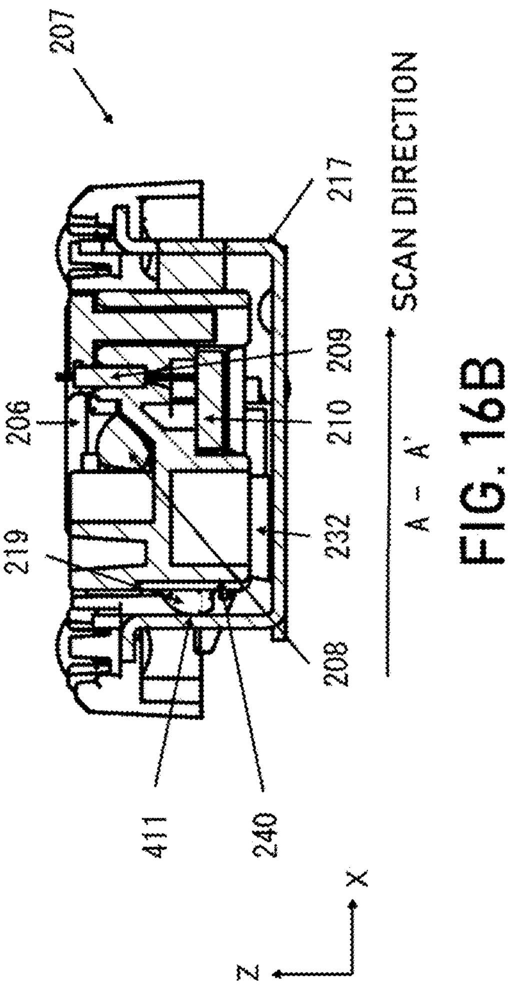

207 according to the present embodiment. FIG. 16B is a cross-sectional view illustrating a cross-section A-A' of the image sensor 206, the sensor holder 217 serving as a frame portion, and the reading unit 207. The reading unit 207 is made up of the image sensor 206, the sensor holder 217, and the slider 218 (see FIGS. 5A to 5C).

The image sensor 206 includes a sensor frame 240. The lightguide member 208 and the rod lens array 209 are disposed within the sensor frame 240, in that order from the upstream side in the scan direction. An electric board 210, on which the photo acceptance unit is mounted, is disposed downward in the Z direction from the rod lens array 209. Also, two protrusions 219 are provided to the image sensor 206, on both end portions in the main scanning direction which is the longitudinal direction, at an end face of the sensor frame 240 on the upstream side in the scan direction. The protrusions 219 are situated on the upstream side in the scan direction, as viewed from the lightguide member 208 and the rod lens array 209 described above. Also, the protrusions 219 are disposed in contact with a contact portion 411 on an inner wall of the sensor holder 217, on the upstream side in the scan direction.

Scanning when reading will be described with reference to FIGS. 6, 16A, and 16B. When the CPU 115 inputs a drive instruction to the motor 220, the belt 222 moves in conjunction with the motor being driven, and the sensor holder 217 is scanned via the drive conveying unit 239, omitted from illustration, that is connected to the belt 222. At this time, the image sensor 206 that is in contact with the sensor holder 217 via the contact portion 411 is also scanned along with the sensor holder 217. Thus, according to the present embodiment, drive force is conveyed from the sensor holder 217 to the image sensor 206 via the protrusions 219. Note that two of the protrusions 219 are provided in the present embodiment, but the number is not limited to two, and it is sufficient for a plurality thereof to be provided.

Figure 17:
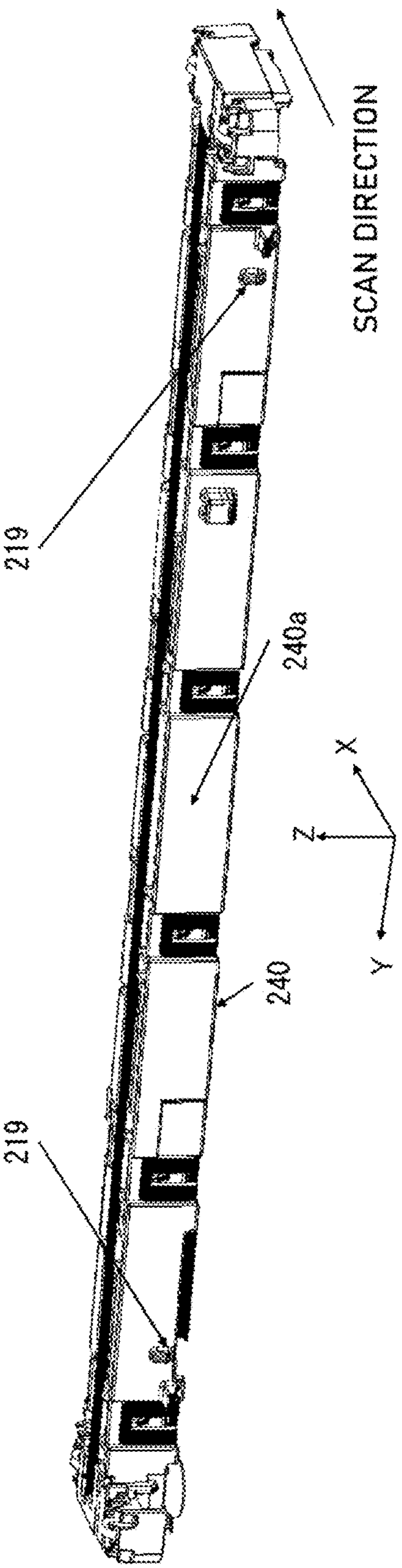
FIG. 17 is a perspective view of the reading unit according to the embodiment.

FIG. 17 is a perspective view of the image sensor 206 as viewed from the upstream side in the scan direction. In the present embodiment, the two protrusions 219 are disposed on a face 240*a* of the sensor frame 240 that is orthogonal to the scan direction, and are protruding forms protruding in an opposite direction from the scan direction. Also, the positions of the two protrusions 219 in the Z direction are configured such that the protrusions 219 fit within the height of the inner wall of the sensor holder 217 where the contact portion 411 comes into contact.

Figure 18:
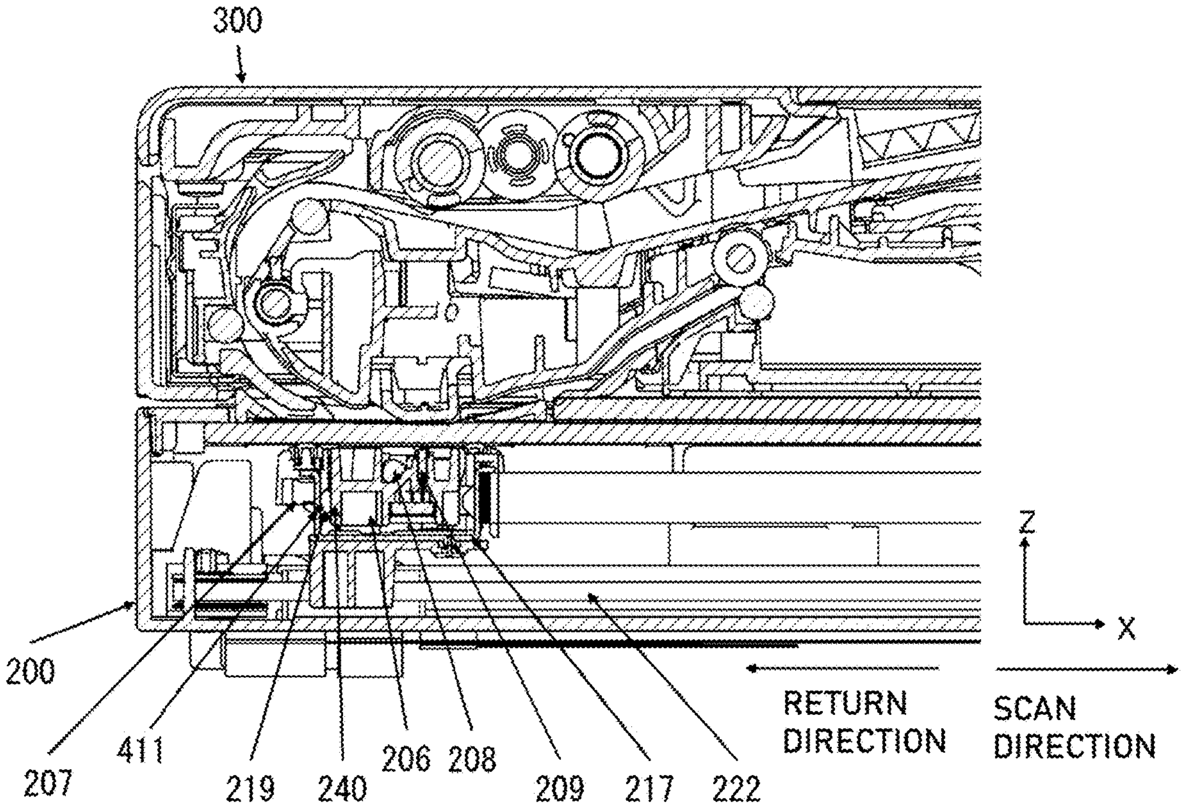
FIG. 18 is a cross-sectional view illustrating a configuration of a scanner unit and a document feeder device according to the embodiment.

FIG. 18 is a diagram illustrating a principal section of the scanner unit 200 and the ADF unit 300 at the device leftward side. Here, the reading unit 207 is positioned at the ADF reading position g. As described earlier, the sensor holder 217 is capable of reciprocal movement in the scan direction and the return direction, under motive power from the motor 220 that is omitted from illustration. In a case of scanning in the scan direction, the sensor holder 217 conveys the driving force to the image sensor 206 via the contact portion 411 with the protrusions 219 that the sensor frame 240 has, thereby moving the image sensor 206 in the scan direction.

Figure 19A:
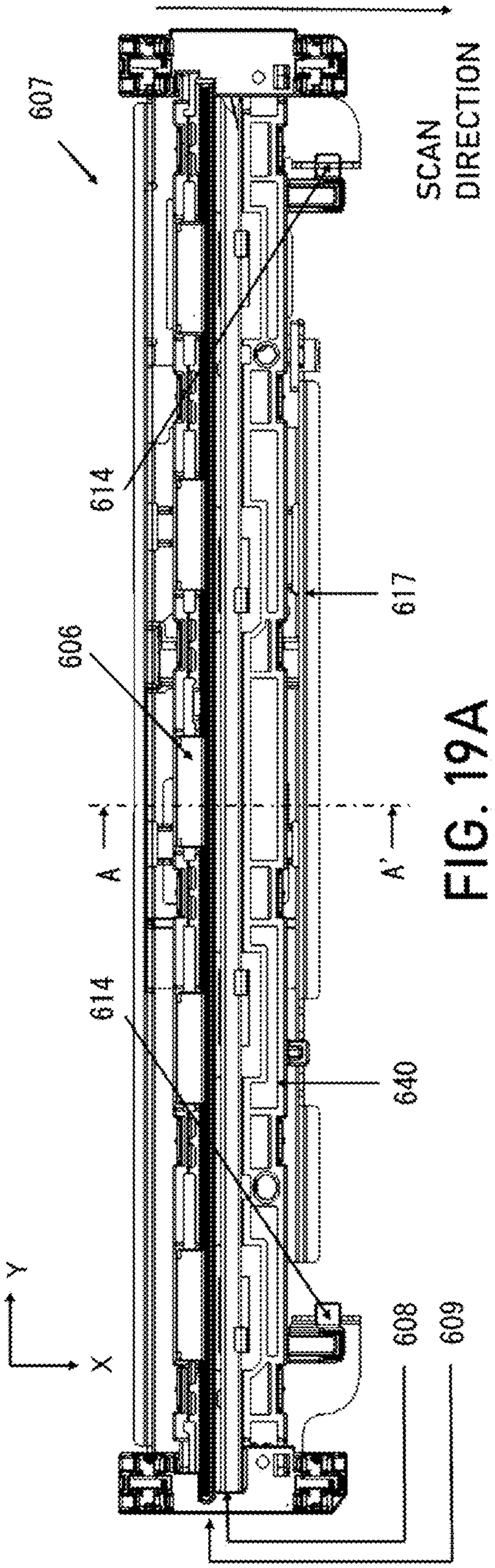
Figure 19B:
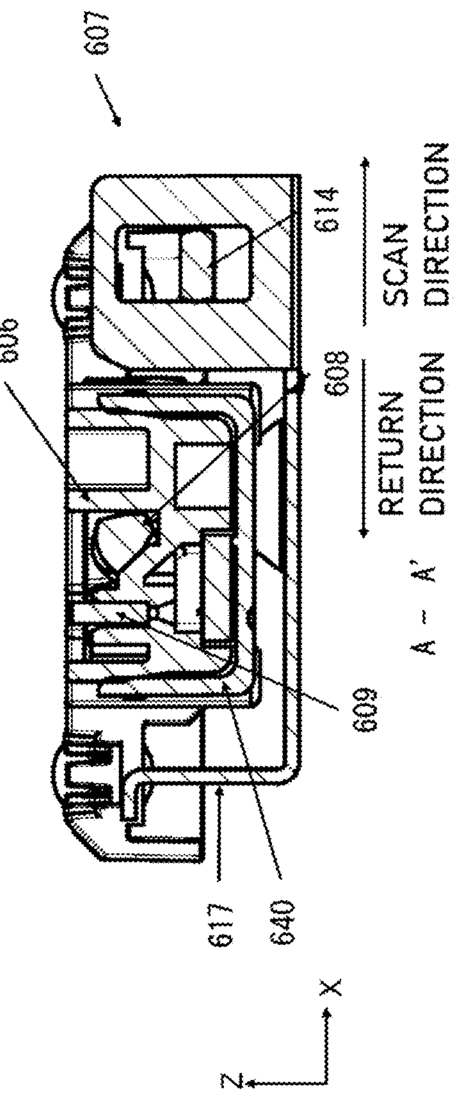

Next, the features of the configuration according to the present embodiment will be described through comparison of the reading units of the present embodiment and a conventional example. FIG. 19A is a top view of a reading unit 607 according to the conventional example. FIG. 19B is a cross-sectional view illustrating a cross-section A-A' of an image sensor 606, a sensor holder 617, and the reading unit 607. In the same way as the present embodiment, the reading unit 607 is made up of the image sensor 606, the sensor holder 617, and a slider (see FIG. 5B). The image sensor 606 includes a sensor frame 640. A rod lens array 609 and a lightguide member 608 are disposed within the sensor frame 640, in that order from the upstream side in the scan direction. An electric board 610, on which a photo acceptance unit is mounted, is disposed downward in the Z direction from the rod lens array 609. Also, the sensor frame 640 has a rib 614 that extends in the Y direction orthogonal to the scan direction, on the downstream side of the lightguide member 608 in the scan direction, and is configured having a drive force conveying portion that conveys motive force in the scan direction and the return direction at a contact point of abutting the sensor holder 617.

Figure 20B:
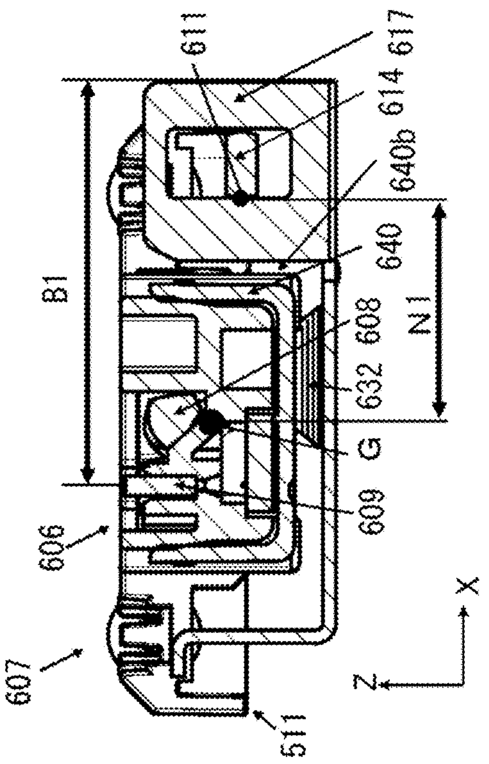
FIGS. 20A and 20B are cross-sectional views illustrating the configurations of the reading units according to the embodiment and the conventional example.
Figure 20A:
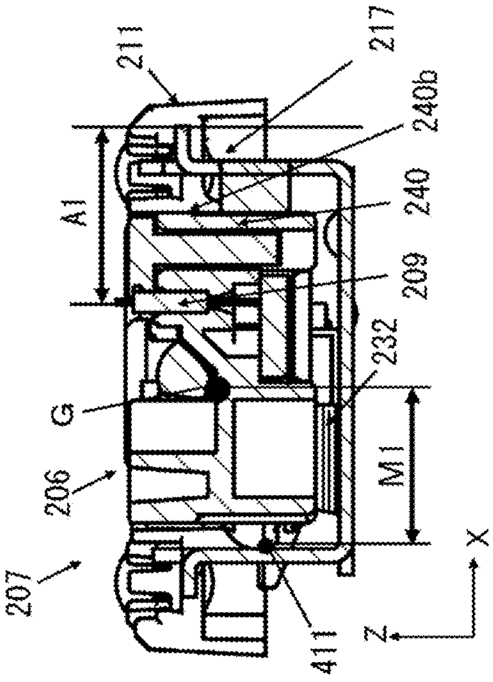

FIGS. 20A and 20B are cross-sectional views of each of the reading units, for comparison of the present embodiment and the conventional example. FIG. 20A is a cross-sectional view of the reading unit 207 according to the present embodiment. A1 in FIG. 20A indicates the distance in the scan direction from the rod lens array 209 to a right end face of the sensor holder 217, and M1 indicates the distance between a center-of-gravity position G of the image sensor 206 and the contact portion 411. FIG. 20B is a cross-sectional view of the reading unit 607 according to the conventional example. B1 in FIG. 20B indicates the distance in the scan direction from the rod lens array 609 to a right end face of the sensor holder 617, and N1 indicates the distance between the center-of-gravity position G of the image sensor 606 and the contact portion 611.

Now, in FIG. 20A, components within the distance A1 are the rod lens array 209, the end portion of the sensor holder 217, and a side wall portion 240*b* therebetween. The side wall portion 240*b* is the side wall of the sensor frame 240 of the image sensor 206.

Conversely, in FIG. 20B, components within the distance B1 are the rod lens array 609, the end portion of the sensor holder 617, and a group of components therebetween. This group of components includes, in addition to a side wall portion 640*b*, the lightguide member 608 and the drive force conveying portion (the contact portion 611 in FIG. 20B corresponds thereto) that conveys drive force to the image sensor 606 by the rib 614. Accordingly, the distance A1 according to the present embodiment is smaller than the distance B1 according to the conventional example.

Also, the distance N1 according to the conventional example is configured with the sensor holder 617 interposed between the sensor frame 640 and the contact portion 611. Conversely, the distance M1 according to the present embodiment does not have other parts interposed between the sensor frame 240 and the contact portion 411. Accordingly, the distance M1 is smaller than the distance N1. That is to say, when comparing the reading units of the present embodiment and the conventional example, the relations of A1<B1 and M1<N1 hold.

In each of the present embodiment and the conventional example, the image sensors (206, 606) are biased against the rear face side of the platen glass 202, omitted from illustration, by the pressing spring (232, 632) serving as biasing means, and the focal point distance as to the document that is placed thereon is maintained through the roller units (211, 511). Then, as described earlier, when driving input is input from the motor 220, the sensor holder (217, 617) slides over the guide rail 221 that is omitted from illustration, in accordance with this input, and the image sensor (206, 606) is made to scan via the contact portion (411, 611).

However, the guide rail 221 tends to change in the Z direction from undulations due to forming, change over time (creep deformation), and so forth, and the position of the sensor holder (217, 617) in the Z direction changes correspondingly. Conversely, the image sensor (206, 606) is biased against and maintained at the rear face side of the platen glass 202, omitted from illustration, by the pressing spring (232, 632), and consequently, the relative positions of the image sensor (206, 606) and the sensor holder (217, 617) change. At this time, frictional force in conjunction with the change in relative position acts on the contact portion (411, 611), and accordingly moment of rotation acts on the center-of-gravity position G of the image sensor (206, 606). Thus, there is concern that the attitude of the image sensor (206, 606) may become unbalanced, causing the focal point distance to change, and leading to deterioration in reading precision.

This moment of rotation is determined by the frictional force acting on the contact portion (411, 611) and the distance (M1, N1) between the center-of-gravity position G and the contact portion, and the greater the moment of rotation is, the more readily the focal point distance changes. In the present embodiment, the moment of rotation, which is a disturbance, is suppressed to a lower level that in conventional arrangements, by M1<N1. As a result, the reading precision can be improved. Also, the contact portion (411, 611) is a protrusion form in the preset embodiment, but may be recessed forms or planar forms instead.

Figure 22A:
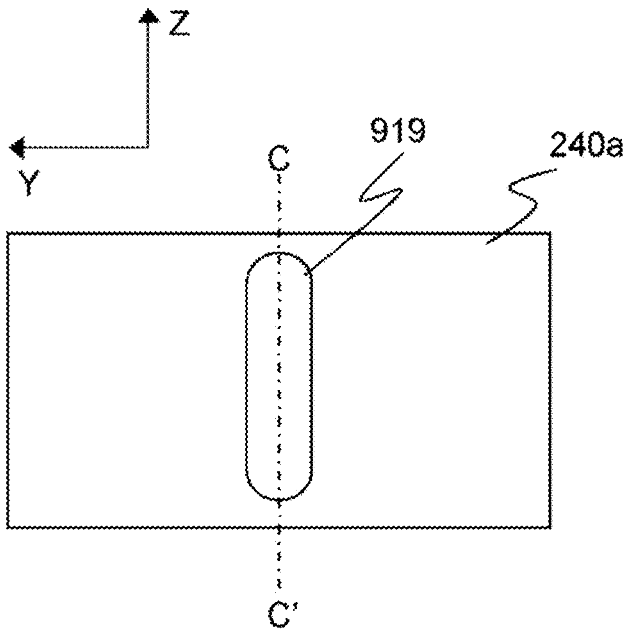
FIGS. 22A to 22C are diagrams illustrating a modification of the reading unit according to the embodiment.
Figure 22B:
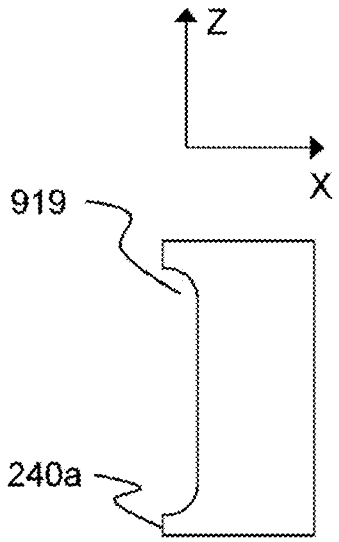
Figure 22C:
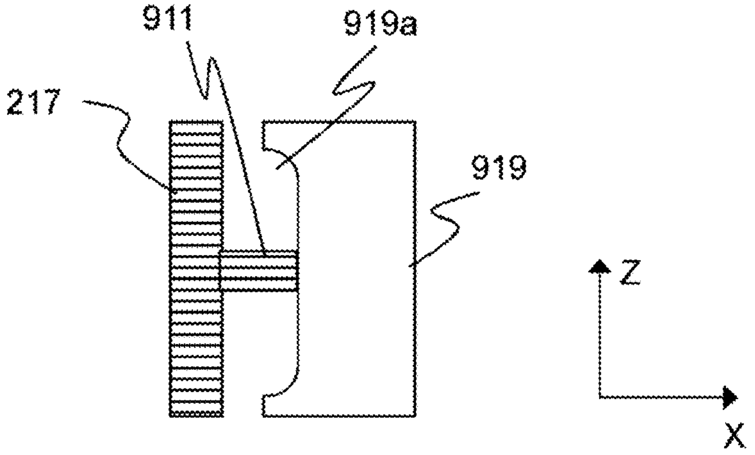

FIGS. 22A to 22C illustrate a modification in which the contact portion has a recessed form. A recessed portion 919 illustrated in the plan view of FIG. 22A and the C-C' cross-sectional view of FIG. 22B is a portion with a recessed form from the face 240*a*, and is provided on the upstream side in the scan direction of the image sensor 206, instead of the protrusions 219. The recessed portion 919 may be provided on both ends of the image sensor 206 in the longitudinal direction, but the number and positions are not limited thereto.

Meanwhile, as illustrated in FIG. 22C, a protruding portion 911 is provided at the portion of the sensor holder 217 facing the recessed portion 919. When scanning, the protruding portion 911 comes into contact with the recessed portion 919, and conveys the driving force from the motor 220 to the image sensor 206. Now, even in a case in which the relative position in the Z direction between the image sensor 206 and the sensor holder 217 changes due to deformation of the guide portion in the Z direction, gaps above and below the protruding portion 911 in the Z direction serve as play, and accordingly effects of up-down movement of the image sensor 206 are suppressed.

Figure 21A:
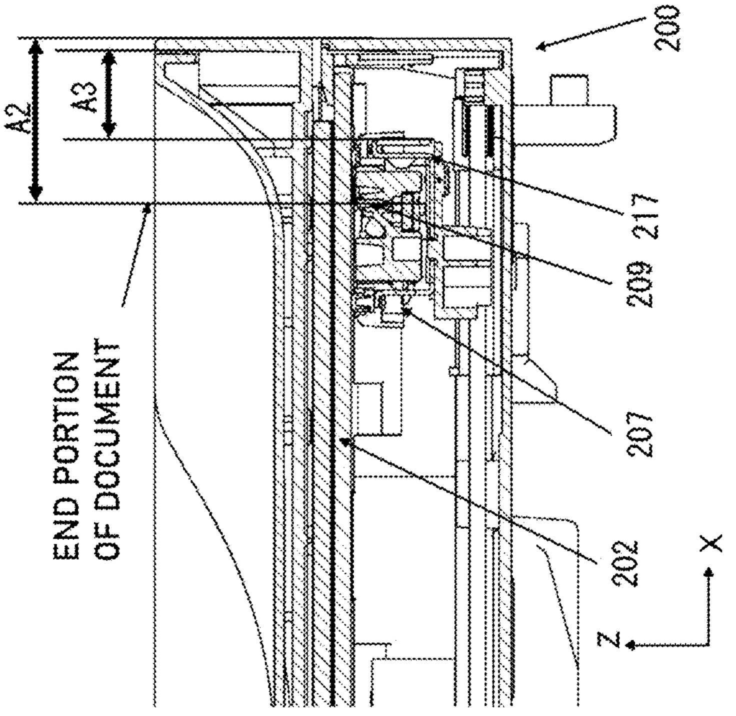
FIGS. 21A and 21B are cross-sectional views illustrating the configurations of scanner units and document feeder devices according to the embodiment and the conventional example.
Figure 21B:
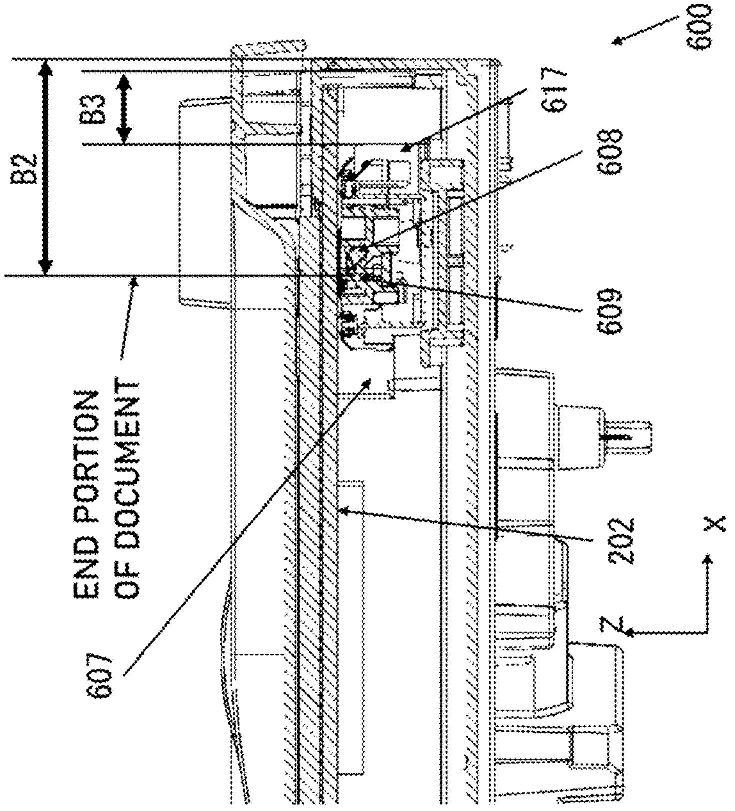

FIGS. 21A and 21B illustrate principal sections of the scanner unit and the ADF unit on the device right side of each of the present embodiment and the conventional example, for comparison thereof. FIG. 21A is a cross-sectional view of the scanner unit 200 according to the present embodiment, in which the reading unit 207 has reached the scanning ending position (hereinafter, "scan end position") of reading a document (omitted from illustration) of the largest readable size that is placed on the platen glass 202. A2 in FIG. 21A indicates the distance between the rod lens array 209 and the right end face of the scanner unit 200. A3 in FIG. 21A indicates the distance from the right end face of the sensor holder 217 to a right end inner wall of the scanner unit 200. This A3 is a clearance that is set in accordance with mechanical variance. In the present embodiment, a right end portion of the scanner unit 200 matches the right end of the device main unit.

FIG. 21B is a cross-sectional view of a scanner unit 600 according to the conventional example, in which the reading unit 607 is at the scan end position. B2 in FIG. 21B indicates the distance between the rod lens array 609 and a right end face of the scanner unit 600. B3 in FIG. 21B indicates the distance from the right end face of the sensor holder 617 to a right end inner wall of the scanner unit 600. This B3 is a clearance that is set in accordance with mechanical variance. In the conventional embodiment, a right end portion of the scanner unit 600 matches the right end of the device main unit.

Now, the distance A3 and the distance B3 are the same distance, due to both being clearance that is set in accordance with the same mechanical variance. Also, the difference between the distance A2 and the distance B2 is the same as the difference between the above-described distance A1 and distance B1. Accordingly, it is clear that the distance A2 according to the preset embodiment will be shorter than the distance B2 according to the conventional example. Thus, A2<B2 holds in the configuration according to the present embodiment, and accordingly the overall size of the device can be reduced as compared with that of the conventional example. Although the above description relates to a device having a scanner unit and an ADF unit, the same effects can be obtained with devices made up of a scanner unit with no ADF unit installed.

As described above, in conventional reading devices, when the guide rail for guiding a carriage for image sensing exhibits deformation in a device vertical direction caused by undulations due to forming, creep deformation, and so forth, the carriage position also changes accordingly. As a result, there was a problem in that frictional force was generated by sliding of the contact portion, the image sensor readily moved away from the rear face of the platen glass, and reading precision deteriorated. Conversely, according to the configuration of the present embodiment, driving force can be conveyed at a position closer to the center of gravity of the image sensor, and suppressing change in distance between the image sensor and the document enables reading precision to be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-108148, filed on Jun. 30, 2023, which is hereby incorporated by reference wherein in its entirety.

What is claimed is:

1. A reading device, comprising:

a platen having a first face configured to face a document;

an image sensor including reading means configured to read the document via the platen, and a frame portion configured to accommodate the reading means;

a holder that has biasing means configured to bias the frame portion toward a second face of the platen, and that holds the image sensor such that the frame portion contacts the second face; and a guide member that extends in a scanning direction of the image sensor, and to which the holder is movably attached, wherein the holder has, on an upstream side in the scanning direction with respect to the image sensor, a contact portion that contacts the frame portion, the contact portion coming into contact with the frame portion so as to be capable of displacing a position of contact with the frame portion in a direction intersecting the second face of the platen, and the image sensor reads the document by the reading means, by moving in the scanning direction under force that the frame portion receives from the contact portion.

2. The reading device according to claim 1, wherein the contact portion is a face that intersects the scanning direction, and the frame portion has a protruding portion that protrudes in a direction opposite to the scanning direction, with the face coming into contact with a distal end thereof.

3. The reading device according to claim 1, wherein the contact portion is a protruding portion that protrudes in the scanning direction, and the frame portion has a face that intersects the scanning direction and with which a distal end of the protruding portion comes into contact.

4. The reading device according to claim 3, wherein the frame portion has, on a side face that intersects the scanning direction on the upstream side of the scanning direction, a recessed portion that is recessed in the scanning direction, the face is a bottom face of the recessed portion, and a width of the recessed portion in at least a direction intersecting the second face of the platen is a width that permits displacement of a contact position of the protruding portion as to the bottom face, in conjunction with relative movement between the image sensor and the holder in the direction intersecting the second face of the platen.

5. The reading device according to claim 1, wherein the contact portion has a plurality of contact positions with respect to the frame portion, of which positions in a longitudinal direction that intersects the scanning direction differ from each other.

6. The reading device according to claim 1, wherein, with the contact portion as a first contact portion, and a portion of the frame portion that comes into contact with the first contact portion as a first contact-receiving portion, the first contact portion and the first contact-receiving portion are disposed on a first side of a longitudinal direction that intersects the scanning direction, the holder has, on the upstream side in the scanning direction with respect to the image sensor, a second contact portion that comes into contact with the frame portion in the scanning direction, the frame portion has, on the upstream side in the scanning direction, a second contact-receiving portion that the second contact portion comes into contact with, the second contact portion and the second contact-receiving portion are disposed on a second side, which is an opposite side from the first side, in the longitudinal direction, and the image sensor is configured to move in the scanning direction while sliding with respect to the second face of the platen, under force that the first contact-receiving portion receives from the first contact portion, and force that the second contact-receiving portion receives from the second contact portion.

7. The reading device according to claim 1, wherein the reading means includes a light-emitting element, an imaging lens, and a photo acceptance unit.

8. The reading device according to claim 7, wherein the contact portion, the light-emitting element, and the imaging lens are arrayed in this order from the upstream side in the scanning direction toward the downstream side.

9. The reading device according to claim 8, wherein the photo acceptance unit is disposed on an opposite side of the imaging lens from the platen.

10. The reading device according to claim 1, wherein the biasing means is a spring that is provided between a first face of the frame portion following the scanning direction on an opposite side from the side thereof that comes into contact with the second face of the platen, and a second face of the holder following the scanning direction that faces the second face in a perpendicular direction as to the first face, the spring being compressed in a direction perpendicular to the second face.

11. A recording device, comprising:

the reading device according to claim 1, wherein an image read by the reading means is recorded with recording means.

* * * * *